(12) United States Patent
Scott

(10) Patent No.: US 8,018,597 B2
(45) Date of Patent: Sep. 13, 2011

(54) SLAB WAVEGUIDE SPATIAL HETERODYNE SPECTROMETER ASSEMBLY

(75) Inventor: Alan Douglas Scott, Kemptville (CA)

(73) Assignee: COM DEV International Ltd., Cambridge (CA)

( * ) Notice: Subject to any disclaimer, the term of this patent is extended or adjusted under 35 U.S.C. 154(b) by 256 days.

(21) Appl. No.: 12/142,860

(22) Filed: Jun. 20, 2008

(65) Prior Publication Data

US 2009/0316159 A1 Dec. 24, 2009

(51) Int. Cl.
  *G01B 9/02* (2006.01)
  *G01J 3/45* (2006.01)
(52) U.S. Cl. ...................................... 356/451
(58) Field of Classification Search .................. 356/451, 356/454, 480, 484
  See application file for complete search history.

(56) References Cited

U.S. PATENT DOCUMENTS

| | | | |
|---|---|---|---|
| 5,059,027 A | 10/1991 | Roesler et al. | |
| 5,257,089 A | 10/1993 | Stetson | |
| 5,267,336 A | 11/1993 | Sriram et al. | |
| 5,424,826 A | 6/1995 | Kinney | |
| 5,784,507 A | 7/1998 | Holm-Kennedy et al. | |
| 5,978,532 A | 11/1999 | Rigny et al. | |
| 6,138,046 A | 10/2000 | Dalton | |
| 6,160,618 A | 12/2000 | Garner | |
| 6,452,675 B1 | 9/2002 | Müller et al. | |
| 6,455,842 B1 | 9/2002 | Pouteau et al. | |
| 6,646,747 B2 | 11/2003 | Deliwala | |
| 6,658,173 B2 * | 12/2003 | Delwala | 385/15 |
| 6,741,349 B1 | 5/2004 | Sweatt et al. | |
| 7,061,610 B2 | 6/2006 | Mittelstein et al. | |
| 7,317,535 B2 * | 1/2008 | Cheben et al. | 356/451 |
| 7,567,736 B2 * | 7/2009 | Ishikawa et al. | 385/15 |
| 2003/0200414 A1 | 10/2003 | Harley | |
| 2004/0136714 A1 | 7/2004 | Shahar et al. | |
| 2005/0141808 A1 | 6/2005 | Cheben et al. | |
| 2005/0151966 A1 | 7/2005 | Packirisamy et al. | |
| 2005/0248769 A1 | 11/2005 | Weitzel | |
| 2005/0275847 A1 | 12/2005 | Moshe | |
| 2006/0159395 A1 | 7/2006 | Hnatiw et al. | |
| 2006/0164637 A1 | 7/2006 | Wang | |

(Continued)

FOREIGN PATENT DOCUMENTS

DE 10010514 9/2000

(Continued)

OTHER PUBLICATIONS

Al Scott et al., Miniature Spectrometers for Planetary Remote Sensing, Proc. SPIE 5660, p. 78, 2004.
Peter Cheben et al. "Wavelength-dispersive device based on a Fourier-transform Michelson-type arrayed waveguide grating", Optics Letters 30, 1824-1826 (2005).

(Continued)

*Primary Examiner* — Michael A Lyons
(74) *Attorney, Agent, or Firm* — Bereskin & Parr LLP; Isis E. Caulder

(57) ABSTRACT

An optical broadband micro-spectrometer containing an input optical assembly, a group of slab waveguide spatial heterodyne spectrometer (SHS) integrated circuits (ICs), a detection module and a processor for multi-line detection. The input optical assembly applies an input light signal uniformly with respect to brightness and frequency to the apertures of the waveguides and may project a pupil image onto the SHS input face and may be a scanner. Each slab waveguide spatial heterodyne spectrometer (SHS) integrated circuit (IC) contains at least one slab waveguide SHS IC. The detection module bonds directly to the slab waveguide output apertures. Each slab waveguide SHS IC may contain one or more slab waveguide SHS.

7 Claims, 16 Drawing Sheets

U.S. PATENT DOCUMENTS

| | | |
|---|---|---|
| 2006/0176485 A1 | 8/2006 | Bulovic et al. |
| 2006/0257091 A1 | 11/2006 | Tabuchi et al. |
| 2007/0076208 A1 | 4/2007 | Koo |

FOREIGN PATENT DOCUMENTS

| | | |
|---|---|---|
| GB | 2 209 210 | 5/1989 |
| GB | 2319335 | 5/1998 |
| JP | 2006 250675 | 9/2006 |
| WO | WO 94/19667 | 9/1994 |

OTHER PUBLICATIONS

European Search Report dated Aug. 3, 2009.

Florjanczyk M et al., "Multiaperture planar waveguide spectrometer formed by arrayed Mach-Zehnder interferometers", Optics Express 20071224 Optical Society of America US, vol. 15, No. 26, pp. 18176-18189.

European Search Report dated Oct. 8, 2009.

\* cited by examiner

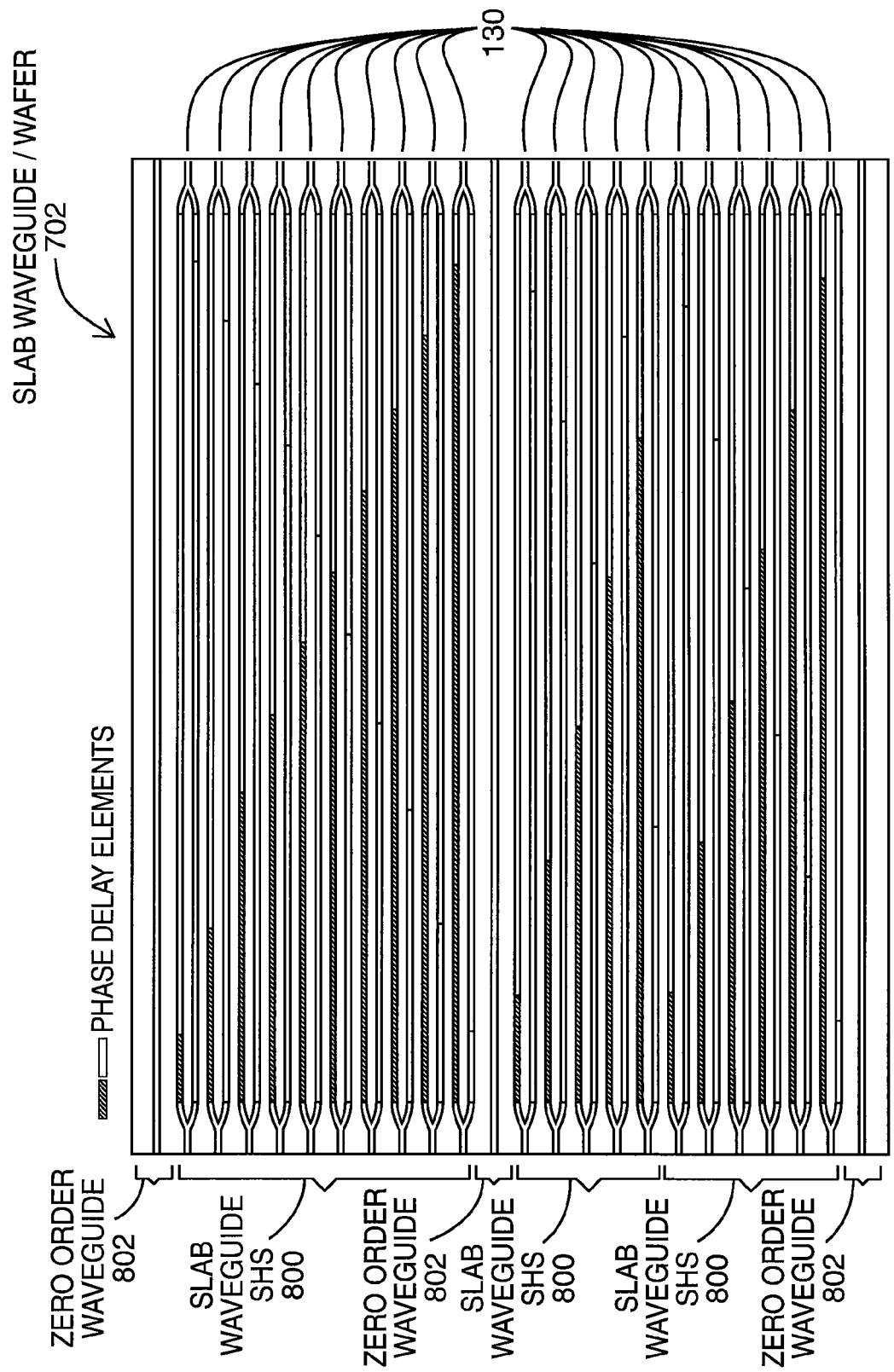

SLAB WAVEGUIDE SPATIAL HETERODYNE SPECTROMETER ASSEMBLY

FIELD

The embodiments described herein relate generally to broadband micro-spectrometers and in particular to applications for a slab waveguide spatial heterodyne spectrometer (SHS).

BACKGROUND

One of the key technologies in telecommunications is the use of wavelength division multiplexed (WDM) networks to increase bandwidth and efficiency. Depending on the application requirements, various types of grating-based spectrometers and Fourier Transform spectrometers are available for identifying the spectrum of an input light signal and determining spectral lines of interest for an input light signal.

A grating-based spectrometer usually includes bulk optics and an interface to a processing unit. These grating-based spectrometers require complicated fabrication processes to form the gratings as well as careful handling and precise assembly of the bulk optics components. They achieve high resolution by reducing the width of the input aperture, which leads to a reduction in the light gathering capability (étendue) of the device. This results in a low signal to noise ratio (SNR) and high acquisition time. Further, there are physical limits to the resolution based on the density of facets. This ultimately sets a practical limit on resolution regardless of the reduction in étendue.

Another grating-based technology is Array Waveguide Gratings (AWG) technology. AWG technology disperses the spectrum of the input signal based on interference of the input signal caused by a large number of waveguides with a constant length increment. AWG technology can multiplex several wavelengths onto a single physical channel at the transmission end and are also used as demultiplexers at the receiving end of an optical communication network. However, like other grating-based spectrometers, they suffer from limited resolution and require demanding alignment tolerances to function properly.

Fourier Transform Spectrometers (FTS) can deliver high resolution levels comparable to grating-based spectrometers while maintaining a large étendue. However, they usually require moving parts or bulk optics, which are undesirable in a micro-spectrometer.

Finally, planar waveguide wavelength dispersive device technology provides for an arrayed waveguide spectrometer with multiple input apertures to increase étendue.

SUMMARY

The embodiments described herein provide in one aspect, a micro-spectrometer for determining spectral lines of interest for an input light signal, said micro-spectrometer comprising:
  (a) at least one interferometer for visualizing and measuring differences in the phase of the input light signal and generating an interferogram;
  (b) an input optical assembly for applying the input light signal to the at least one interferometer, uniformly in brightness and spectral content;
  (c) a detector for detecting the interferogram generated by the interferometer and transforming it to an electronic representation of the interferogram; and
  (d) a processor for processing the electronic representation of the interferogram and for determining the spectral lines of interest.

The embodiments described herein provide in another aspect, a micro-spectrometer for determining spectral lines of interest of an input light signal, said micro-spectrometer comprising:
  (a) a plurality of vertically stacked slab waveguide spatial heterodyne spectrometer (SHS) integrated circuits, each directed to a narrow spectral region of the input light signal for visualizing and measuring differences in the phase of the narrow spectral region of the input light signal and for generating an interferogram;
  (b) a detector for detecting the interferograms generated by the interferometers and transforming them to an electronic representation of the interferograms; and
  (c) a processor for processing the electronic representation of the interferograms and determining the spectral lines of interest.

The embodiments described herein provide in another aspect, a slab waveguide spatial heterodyne spectrometer integrated circuit for visualizing and measuring differences in the phase of an input light signal, said slab waveguide spatial heterodyne spectrometer integrated circuit comprising:
  (a) a plurality of vertically stacked slab waveguides, each slab waveguide containing at least one slab waveguide spatial heterodyne spectrometer (SHS).

The embodiments described herein provide in another aspect, a method to process spatial distributed interferograms for analyzing the properties of an input signal, said method comprising:
  (a) conducting channel equalization and apodization,
  (b) utilizing a Fast Fourier Transform (FFT) to create a heterodyned spectrum using the results from (a); and
  (c) performing a background subtraction on the heterodyned spectrum to detect a clear line spectrum.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 8A is a top view of an exemplary slab waveguide wafer of FIG. 7 incorporating a plurality of Mach-Zehnder Interferometers (MZI), contained within a slab waveguide spatial heterodyne spectrometer (SHS) integrated circuit of FIG. 6;

Figure 1A:
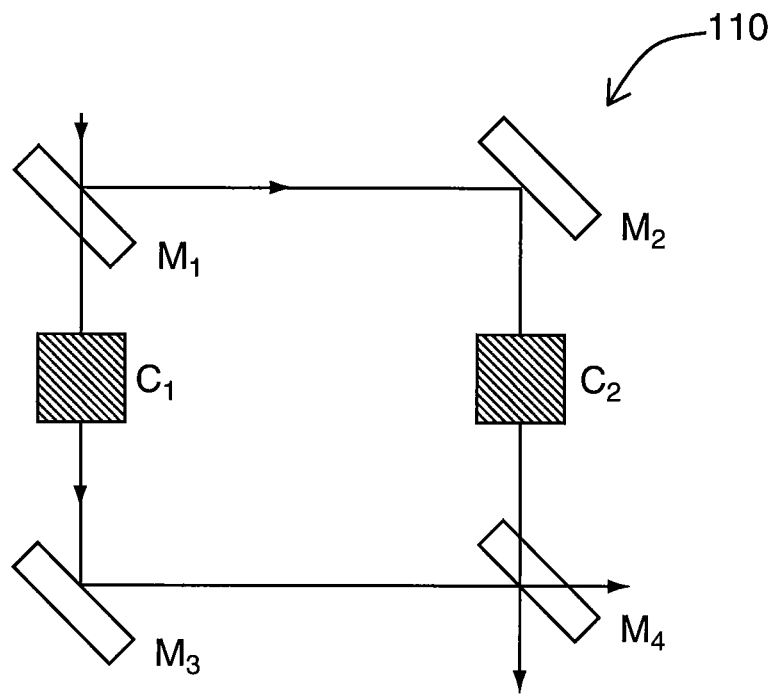
FIG. 1A is a schematic diagram of an example of a prior art Mach-Zehnder Interferometer (MZI)

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

Figure 1B:
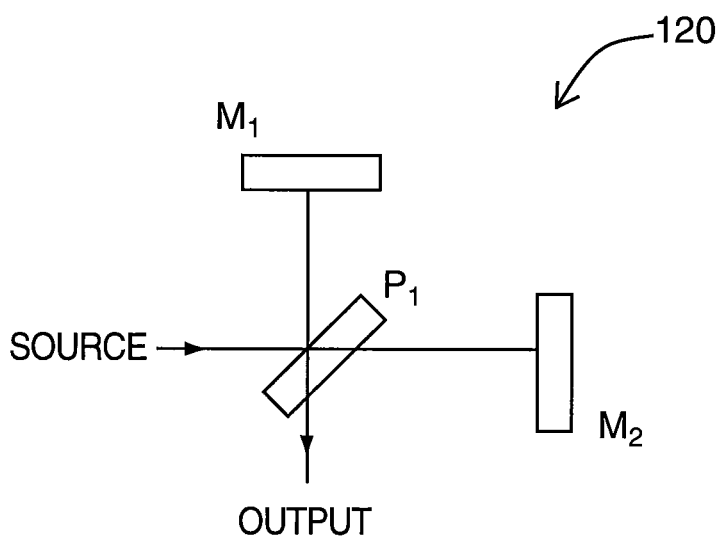
FIG. 1B is a schematic diagram of an example of a prior art Michelson spectrometer.

FIG. 1A is a schematic diagram of the Mach-Zehnder Interferometer (MZI) 110 and FIG. 1B is a schematic diagram of the Michelson interferometer 120. The Mach-Zehnder Interferometer (MZI) is a variation of the Michelson interferometer and its operation depends on amplitude splitting of the wave front. Interferometers can be used for visualizing and measuring differences in the phase of the input light signal.

As shown in FIG. 1A, light enters the instrument and is reflected and transmitted by the semitransparent mirror Mr. The reflected portion proceeds to $M_2$, where it is reflected through the cell $C_2$ to the semitransparent mirror $M_4$. Here it combines with the light transmitted by $M_1$ to produce interference. The light transmitted by $M_1$ passes through a cell $C_1$, which is similar to $C_2$ and is used to compensate for the windows of $C_1$. A major difference between the Mach-Zehnder Interferometer (MZI) 110 (FIG. 1A) and the Michelson interferometer 120 (FIG. 1B) is that in the case of the MZI, light passes through each path in the instrument only once, whereas in the case of the Michelson interferometer, the light traverses each path twice. An effective path length variation of an odd number of half-waves will cause the light to interfere destructively and a dark fringe will appear in the field of view.

A Fourier Transform Spectrometer (FTS) is essentially a Michelson interferometer where one of the two fully-reflecting mirrors is movable, allowing a variable delay in the travel-time of the light to be included in one of the beams. The beams interfere, allowing the interference of the light to be measured at each different time delay setting. By measuring the signal at many discrete positions of the moving mirror, the spectrum can be reconstructed using a Fourier transform of the interferences of the light. However, a Fourier Transform Spectrometer (FTS) requires a movable mirror that is undesirable for integrated circuit applications. For this purpose, the geometry of the Mach-Zehnder Interferometer (MZI) shown in FIG. 1C is more desirable for implementation.

Figure 1C:
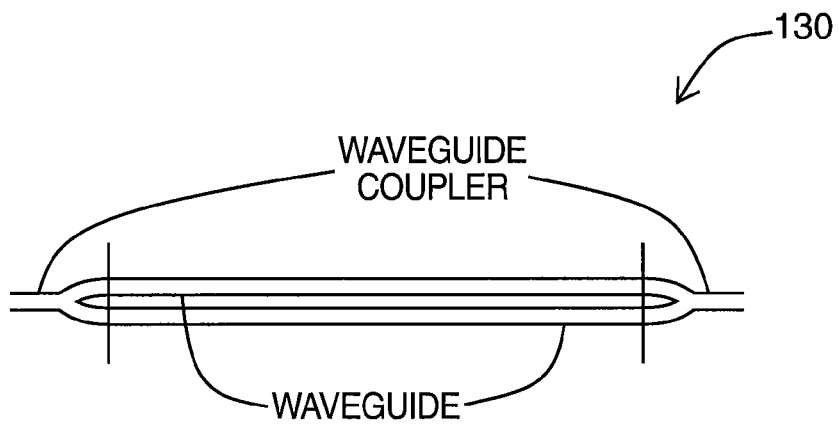
FIG. 1C is a schematic diagram of an example of a prior art Mach-Zehnder Interferometer (MZI) for slab waveguide applications.

FIG. 1C shows a Mach-Zehnder Interferometer (MZI) 130 consisting of two waveguides joined together at the input and output by a waveguide coupler. In general, the waveguides are designed to be of differing lengths, providing an output that varies in intensity as a sinusoidal function of the input wavelength. Multiple Mach-Zehnder Interferometer (MZI) 130 with set path differences can be fabricated on the same wafer to obtain multiple measurements of the interference signal at various path differences.

Figure 1D:
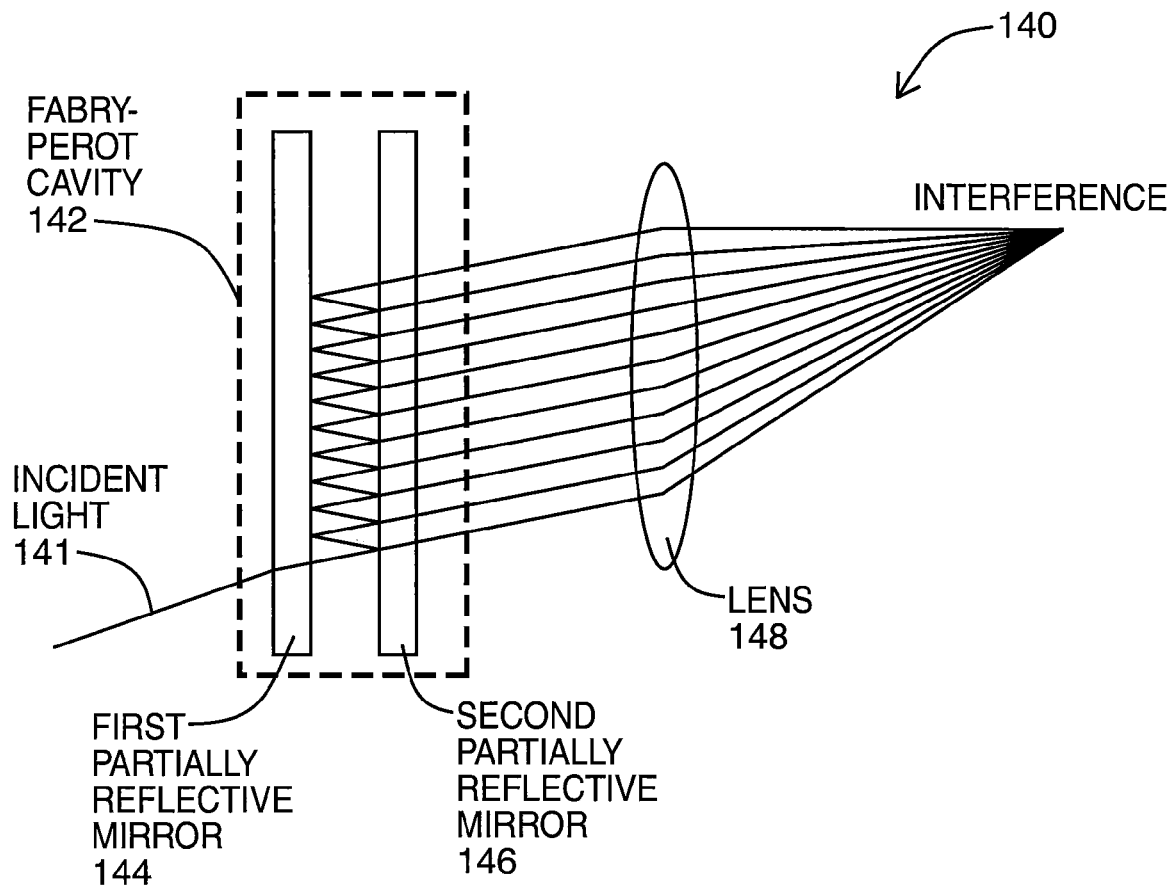
FIG. 1D is a schematic diagram of an example of a prior art Fabry-Perot Interferometer.

FIG. 1D illustrates a Fabry-Perot Interferometer 140 consisting of two partially reflective mirrors 144 and 146. The two partially reflective mirrors 144 and 146 are spaced apart such that part of the incident light 142 that passes through the first mirror 144 is transmitted each time it reaches the second mirror 146, resulting in multiple beams which can interfere with each other. These multiple reflected beams are out of phase by a predetermined offset, and when focused by a lens 148, the interference fringes may form concentric circles. If the mirrors have high reflectivity, the large number of interfering rays provides the interferometer with high resolution for visualizing and measuring differences in the phase of the input light signal.

Figure 2:
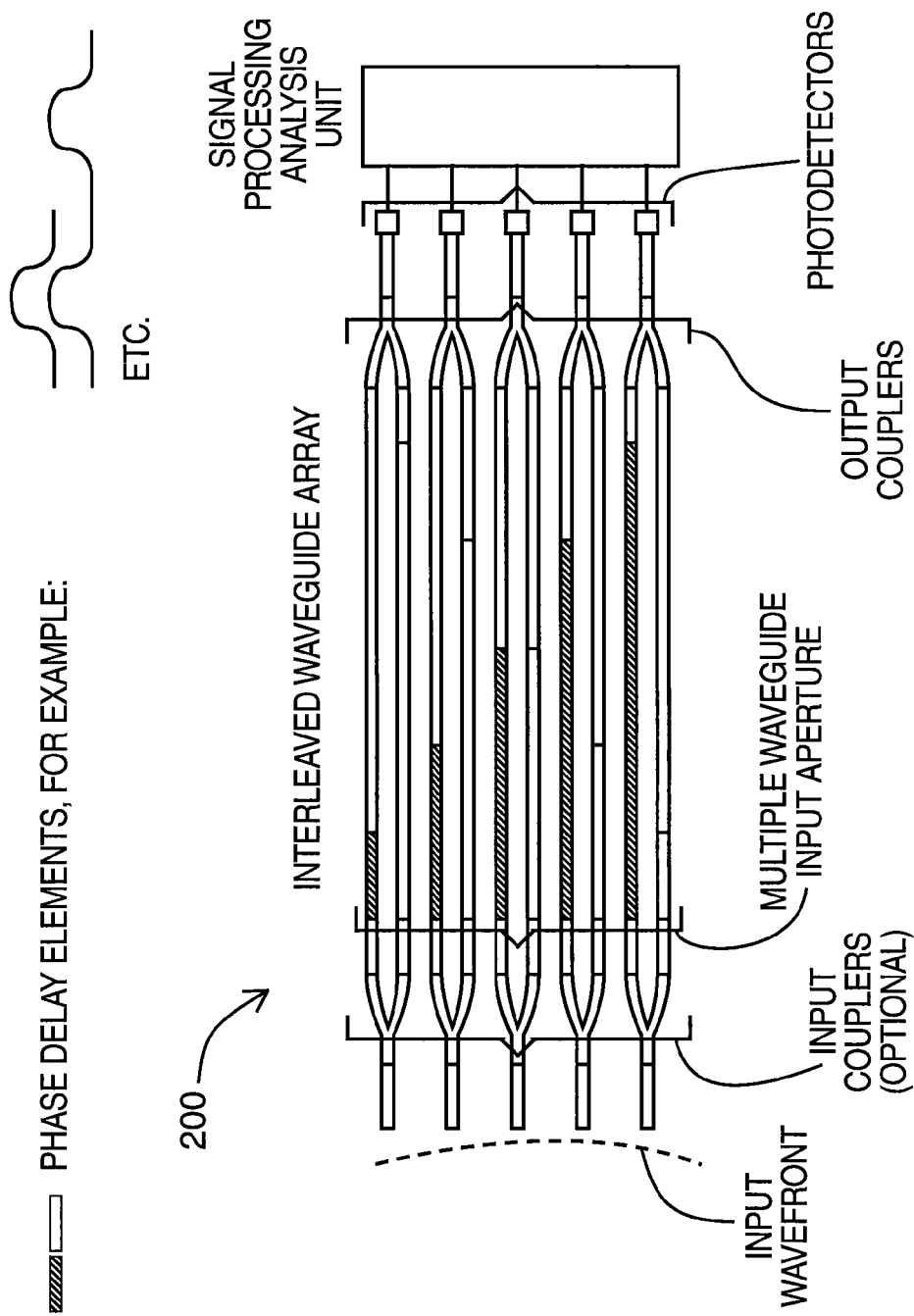
FIG. 2 is a schematic diagram of an example of a Mach-Zehnder based prior art waveguide spatial heterodyne spectrometer (SHS) with multiple input apertures.

FIG. 2 is schematic diagram illustrating a prior art waveguide spatial heterodyne spectrometer (SHS) 200 with multiple input apertures that takes advantage of such a configuration. Adjacent waveguides comprising two interleaved arrays of phase delay elements are joined together, in the input or output of the waveguide array, or both, by a waveguide coupler. The waveguide coupler can be a y-coupler, directional coupler, MMI coupler, or other coupling device known in the art. By joining the waveguides at the output of the array, the light is recombined such that interference occurs directly in the channel waveguide, rather than in the waveguide substrate or free space. As shown, the recombined optical signals are then intercepted by photodetectors.

A distinct photodetector cell can detect the light from each waveguide pair, rendering a distinct Fourier component of the signal.

Figure 3:
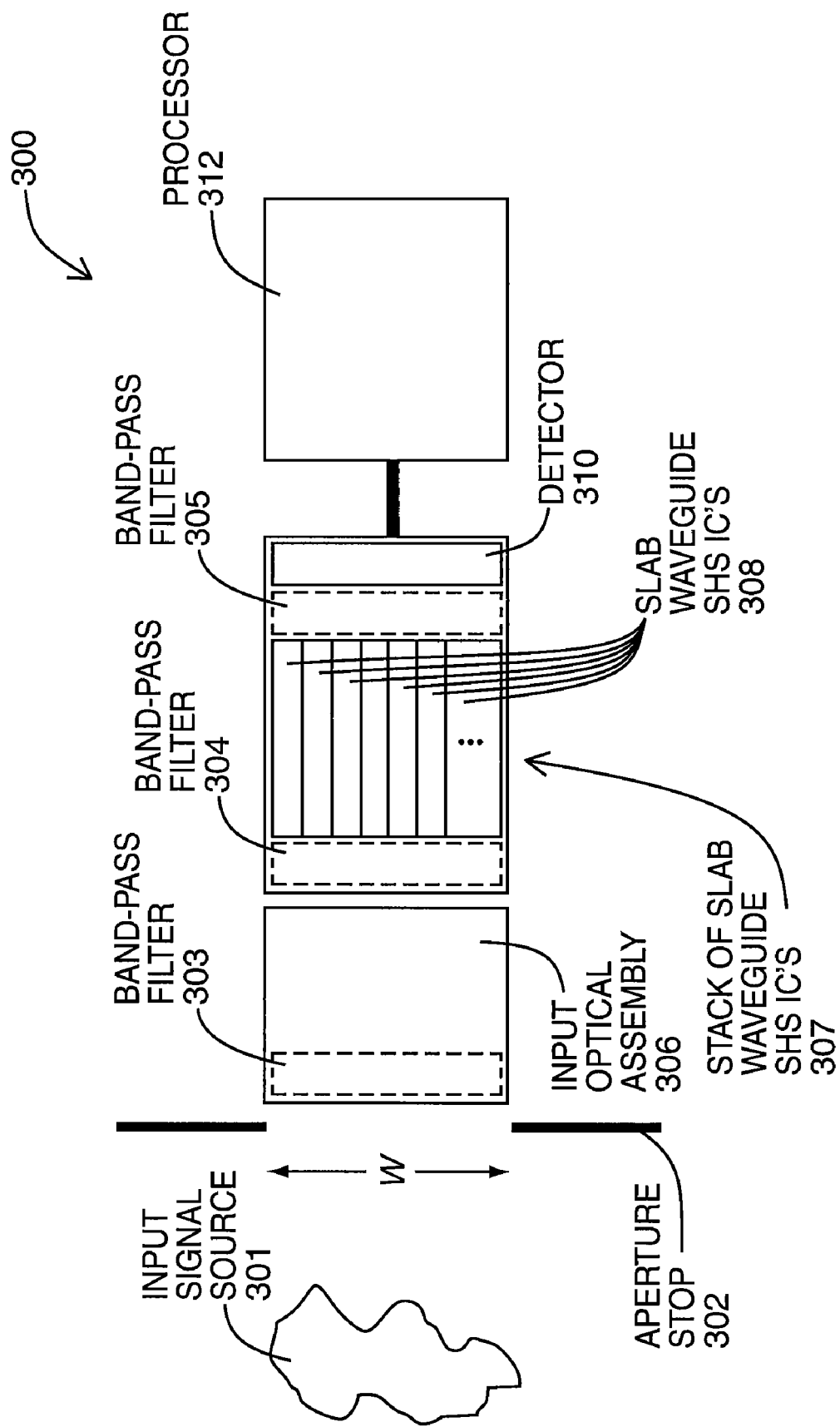
FIG. 3 is a schematic diagram illustrating a side view of an arrangement of optical elements of an exemplary embodiment of a spectrometer.

FIG. 3 depicts an exemplary embodiment of the elements of a micro-spectrometer 300 for determining spectral lines of interest for an input signal. The micro-spectrometer 300 includes an input optical assembly 306, a plurality of individual slab waveguide spatial heterodyne spectrometer (SHS) integrated circuits 308 to contain at least one interferometer, one or more variable band-pass filters 303, 304, 305, a detector 310, and a processor 312.

Figure 8B:
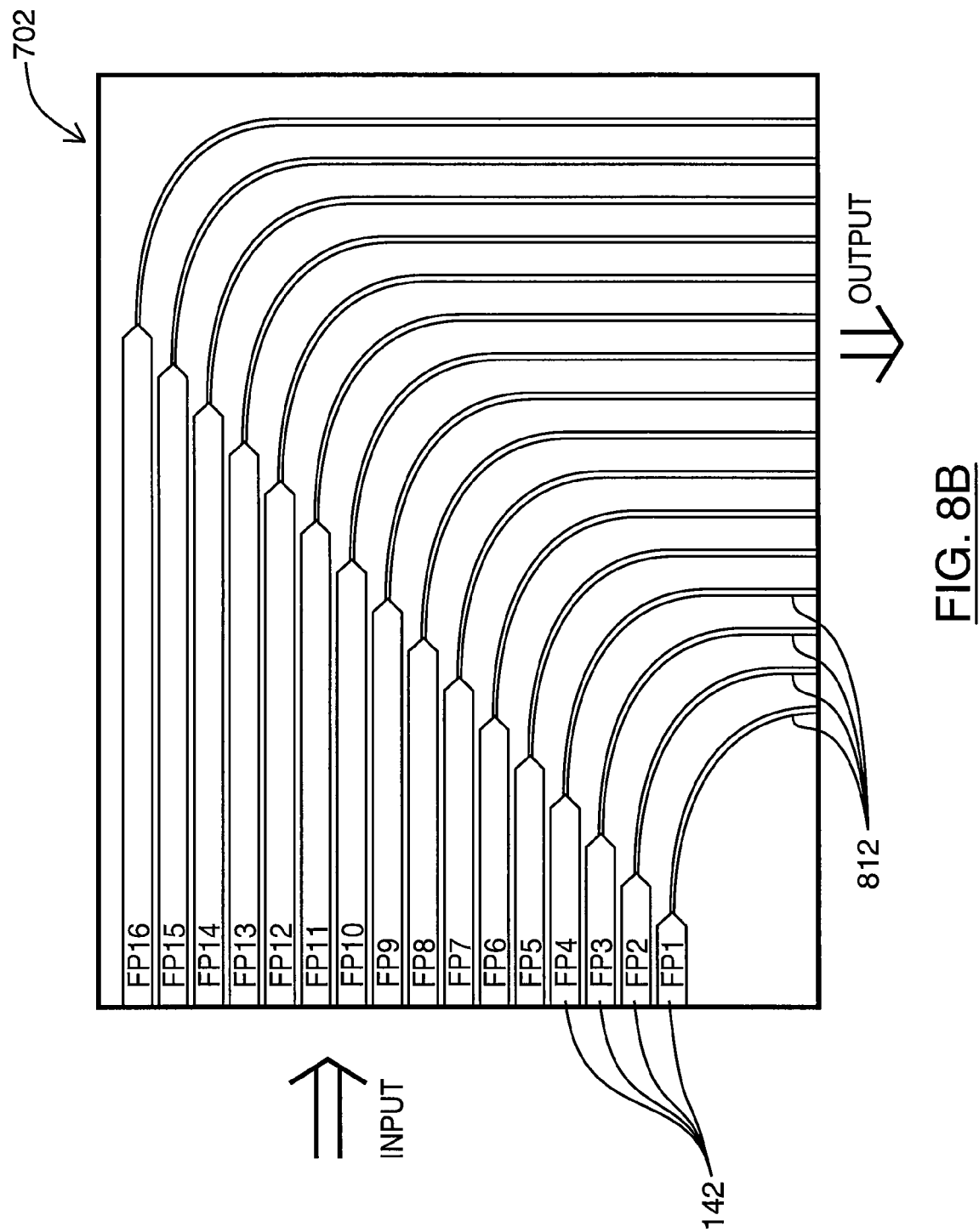
FIG. 8B is a top perspective view of an exemplary slab waveguide wafer of FIG. 7 incorporating a plurality of Fabry-Perot Interferometers, contained within a slab waveguide spatial heterodyne spectrometer (SHS) integrated circuit IC of FIG. 6.

Each slab waveguide spatial heterodyne spectrometer (SHS) integrated circuit 308 can contain more than one slab waveguide spatial heterodyne spectrometer (SHS) 800. Each slab waveguide spatial heterodyne spectrometer (SHS) 800 acts as an interferometer for visualizing and measuring differences in the phase of the input light signal (FIGS. 8A and 8B). The slab waveguide spatial heterodyne spectrometer (SHS) 800 can be realized with MZI technology or Fabry-Perot technology as described in FIGS. 1C and 1D. The specific configurations of the slab waveguide spatial heterodyne spectrometer (SHS) integrated circuits 308 will be further discussed.

Figure 6:
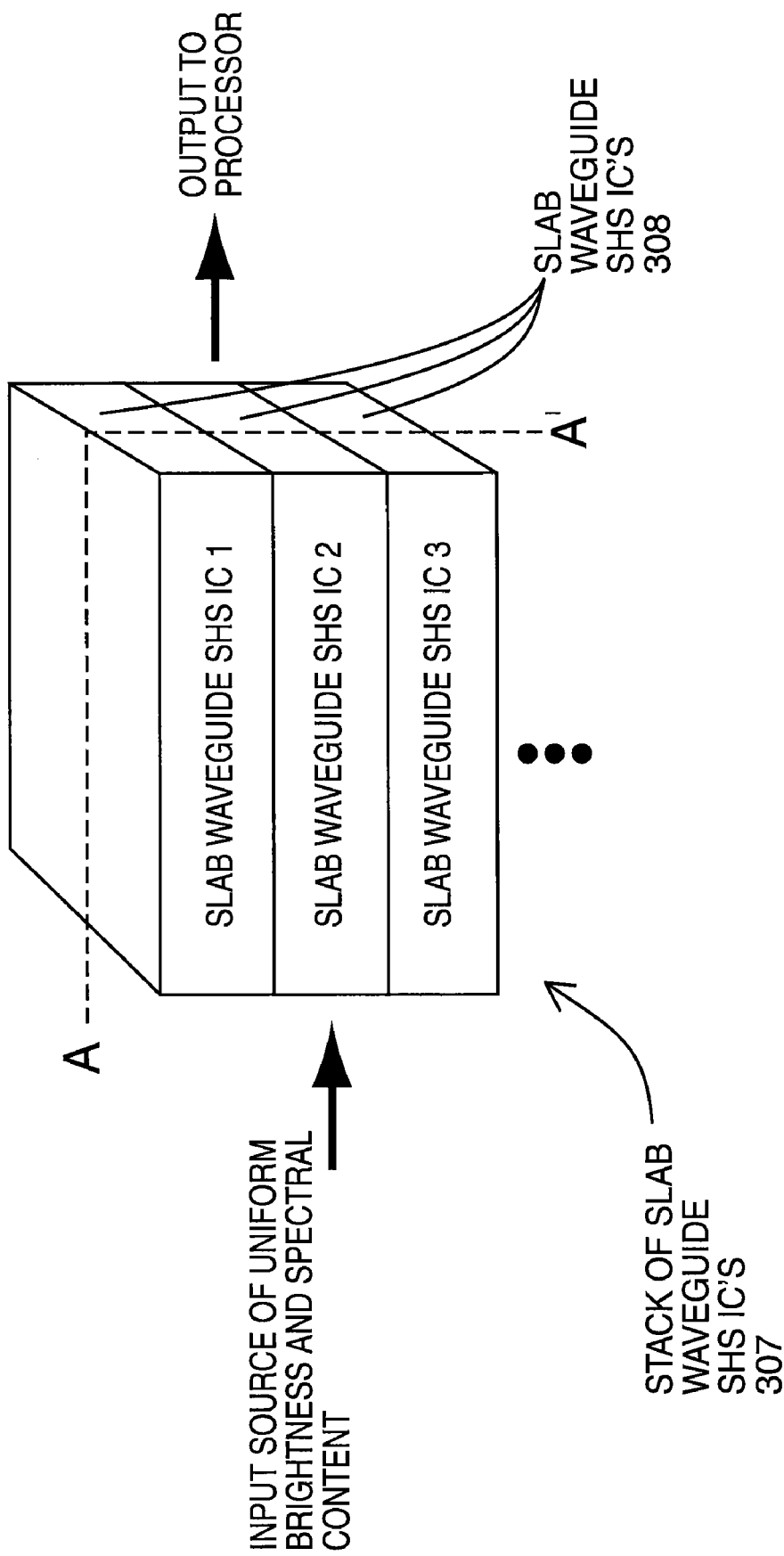
FIG. 6 is a schematic diagram illustrating a side perspective view of the stack of slab waveguide spatial heterodyne spectrometer (SHS) integrated circuits.

The input optical assembly 306 is positioned in front of an input signal source 301 at the location of an aperture stop 302 having a diameter w (FIG. 3). The input signal source 301 provides an input wave that propagates through the aperture stop 302 toward the input optical assembly 306. The individual slab waveguide spatial heterodyne spectrometer (SHS) integrated circuits 308 are stacked vertically to form a vertical stack of slab waveguide spatial heterodyne spectrometer (SHS) integrated circuits 307 (FIG. 6). The input optical assembly 306 allows for flat illumination, uniformly in brightness and spectral content to be provided across the subsequent input facet of the vertical stack of slab waveguide spatial heterodyne spectrometer (SHS) integrated circuits 307. The input facet is formed by the individual facets of the various individual slab waveguide spatial heterodyne spectrometer (SHS) integrated circuits 308. The input optical assembly 306 can also be adjustable to provide varying field of view and spatial resolution. The specific configuration of the input optical assembly 306 will be further discussed.

As shown in FIG. 3, one or more variable band-pass filters 303, 304 and 305 may be positioned at various positions with respect to the slab waveguide spatial heterodyne spectrometer (SHS) integrated circuits 308. The positioning of one or more variable band-pass filters is generally determined based on factors such as the bandwidth and beam angles of the application. The variable band-pass filters are utilized to prevent aliasing of the signals in order to eliminate unnecessary multiplexed shot noise from outside the spectral region of interest. To prevent aliasing, it is generally preferable to choose variable bandpass filters such that the heterodyning (or "Littrow") wavelength of the spatial heterodyne spectrometer (SHS) is at one edge of the band. Also, each of the Mach-Zehnder Interferometers (MZI) 130 are designed to be in-phase at this wavelength and the Optical Path Difference (OPD) increment of the interleaved phase delay arrays is typically an integer multiple of this wavelength.

In addition, since each of the slab waveguide spatial heterodyne spectrometer (SHS) integrated circuit 308 is a Fourier Transform device, light from all transmitted wavelengths is multiplexed into each sample. It is therefore advisable to limit the bandwidth as much as feasible to minimize this noise source. Because the field of view may include a range of field angles, and each field angle will experience a slightly shifted bandpass, there will be a lower limit to the useful filter bandwidth for any application.

The input optical assembly 306 is preferably designed to provide angular magnification, allowing a tradeoff between size of the objective lens and aperture stop versus beam angles at the variable bandpass filters for any fixed field of view. The spectral shape of the bandpass filters 303, 304, 305 is then "flat-topped" to maximize dynamic range and well characterized to allow spectrum correction in software.

Figure 7:
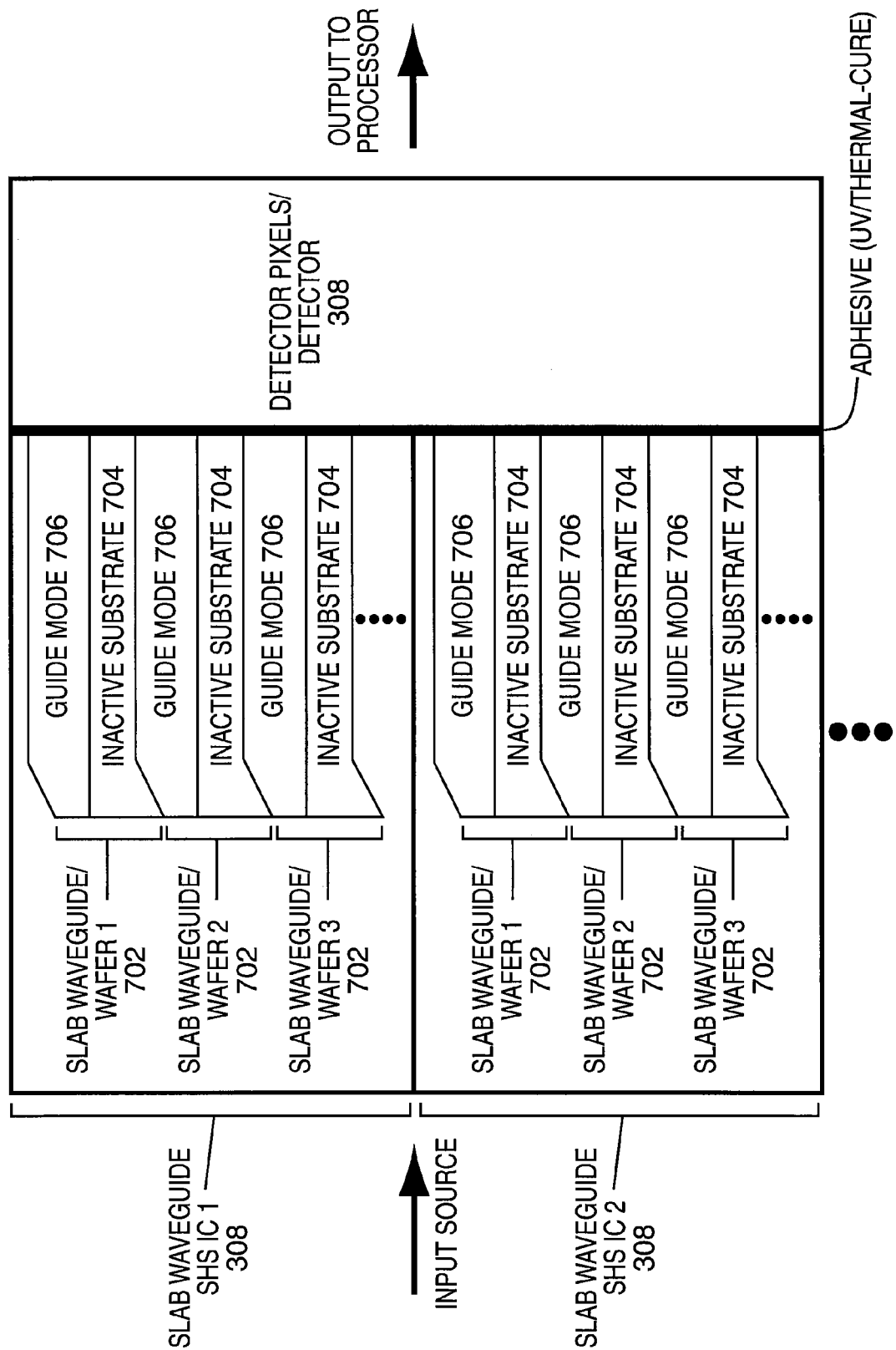
FIG. 7 is a schematic diagram illustrating a cross sectional view of the stack of slab waveguide spatial heterodyne spectrometer (SHS) integrated circuits of FIG. 6 taken along the dashed line of AA'.

Each slab waveguide spatial heterodyne spectrometer (SHS) integrated circuit 308 contains within it multiple slab waveguides or wafers 702 that are configured to be stacked vertically (FIG. 7). Also, each slab waveguide or wafer 702 can incorporate one or more slab waveguide spatial heterodyne spectrometers (SHS) 800 (FIG. 8A) which each act as interferometers for visualizing and measuring differences in the phase of the input light signal. This arrangement will be discussed in more detail below.

As the input wave propagates through the stack of slab waveguide spatial heterodyne spectrometer (SHS) integrated circuits 307, each individual slab waveguide spatial heterodyne spectrometer (SHS) integrated circuit 308 generates at least one spatially distributed interferogram. Each spatially distributed interferogram will be comprised of interferences patterns from all the wavelengths in the filtered input signal.

The detector 310 is coupled directly to the slab waveguide spatial heterodyne spectrometer (SHS) integrated circuits 308. Specifically, the detector 310 is bonded to the output facet of the stack of slab waveguide spatial heterodyne spectrometer (SHS) integrated circuits 307 (FIG. 7). The detector 310 is used to detect and read the multiple spatial distribution interferograms formed in the slab waveguides.

While the detector 310 can be implemented as an array of photovoltaic pixels, it can be any device that produces an electrical signal when irradiated by the proper wavelength of light. Since the output of the stack of slab waveguide spatial heterodyne spectrometer (SHS) integrated circuits 307 will typically consist of electromagnetic radiation emitted from a linear array of single-mode waveguides and since this can be directed to any slab surface, coupling from a high-index waveguide to air is inefficient.

Therefore it is important that the detector 310 be bonded directly to each of the slab waveguides/wafers 702 so that the light is incident directly on the detector active material without encountering air. This can be done with or without appropriate adhesives by coupling the output facets of the each of the slab waveguide spatial heterodyne spectrometer (SHS) 800 and zero order waveguides 802 directly onto the individual detector elements that constitute the detector 310 such that the output light signal will not encounter air or free space.

The processor 312 is coupled to the detector module 310 for processing the spatial distribution interferograms received from the detector 310. The processor 312 obtains the electronic representation of the interferogram provided by the detector 310 and then performs computations on the electronic representation of the interferogram required to provide the desired application-specific spectrum information to the user. The processor 312 can include or be associated with readout electronics to readout the spatial distribution interferograms.

It should be understood that the processor 312 is preferably implemented in conjunction with a data storage medium including volatile and non-volatile memory and/or storage elements (not shown), at least one input device, and at least one output device. Executable program code is stored within the data storage system and applied by the processor 312 to input data to perform the computation described herein and to generate suitable output data. The program code may be implemented in assembly, machine language, a high level procedural or object oriented programming and/or scripting language to communicate with the processor 312.

The program code is preferably stored on a storage media or a device (e.g. ROM or magnetic diskette) readable by the processor 312 for configuring and operating the processor 312 when the storage media or device is read by the processor 312 to perform the procedures described herein. The inventive system may also be considered to be implemented as a physical computer-readable storage medium, configured with a computer program, where the storage medium so configured causes a processor to operate in a specific and predefined manner to perform the functions described herein.

In one embodiment, the processor 312 interoperates with suitably programmed code to perform a Fast Fourier Transform (FFT) on the output received from the detector 310 to form a spectrum as will be described in more detail. The process removes systematic biases from the interferogram signal due to fabrication errors arising mainly from waveguide losses, geometric errors and birefringence in the slab. Output from a Fabry-Perot array embodiment of the slab waveguide SHS is then processed using a general linear transform, of which the Fourier Transform is a limiting case for low reflectivity mirrors. The processor 312 also performs background fitting (e.g. polynomial fitting etc.) and removal followed by measurement of peak intensity and comparison to a threshold.

As shown in FIGS. 8A and 8B, individual interferograms are formed by each slab waveguide spatial heterodyne spectrometer (SHS) 800. Each interferogram requires an input light source of uniform brightness and spectral content. This is easily be achieved in the case of single aperture designs by using a single lens, focused onto the single aperture. However, for a multiple waveguide input aperture design, care must be taken to present the multiple slab waveguide input apertures with a suitably uniform illumination source both spectrally and in brightness, despite variations in the input scene. This must be provided in order to prevent artifacts in the spatially distributed interferogram.

One way to prevent artifacts in the spatially distributed interferogram is to apply the pupil image of a multi-lens optical module to the input aperture of the slab waveguide. The pupil image is a virtual aperture in an optical system and is important because only rays that pass through this virtual aperture can exit the system. The pupil may also refer to the diameter of this virtual aperture and is essentially the image of the aperture stop in the optics that follows it.

The real image of an object is expected to have spectral variations from one point to the next, whereas the pupil image will have an average spectral variation from every point in the scene. Put another way, every point in an object contributes a ray bundle that will be evenly distributed across the pupil image. A centrally obscured input telescope should not be used, since the image of the secondary mirror will shade several input elements. This is due to the fact that since the pupil image is being imaged onto the input elements the secondary mirror will produce a big dark middle spot within the pupil image.

Figure 4A:
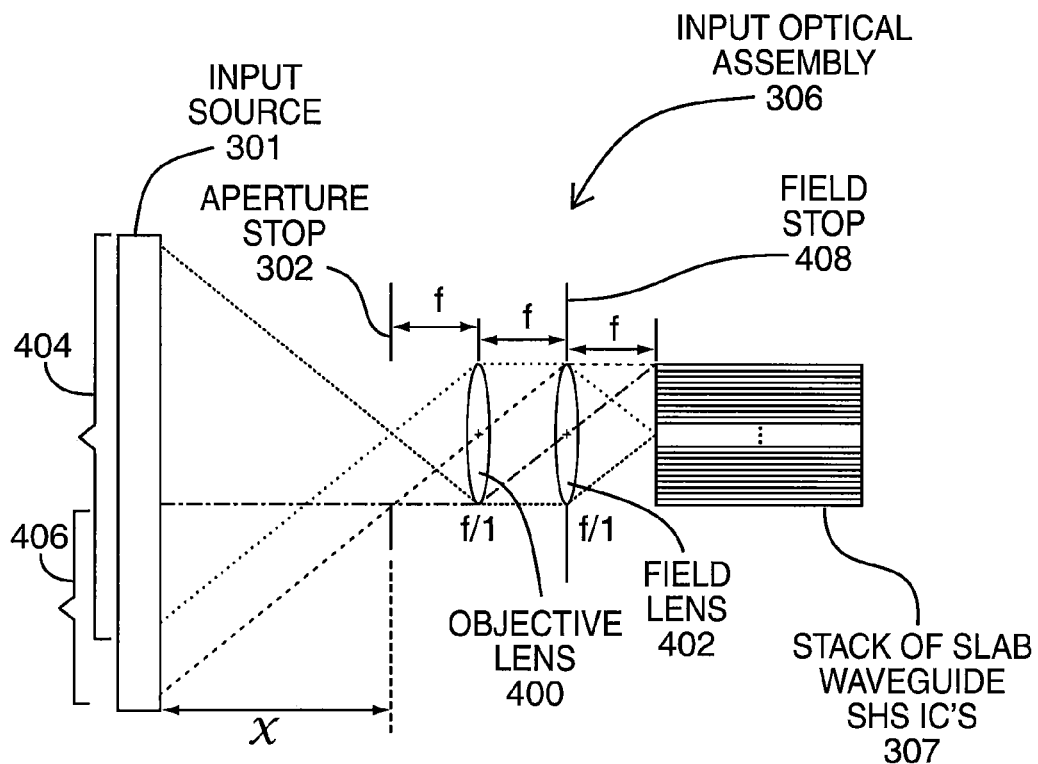
FIG. 4A is a schematic diagram illustrating a side view of an exemplary embodiment of the input optical assembly of FIG. 3, adjusted for maximum brightness of the input signal on the apertures of the waveguides.
Figure 4B:
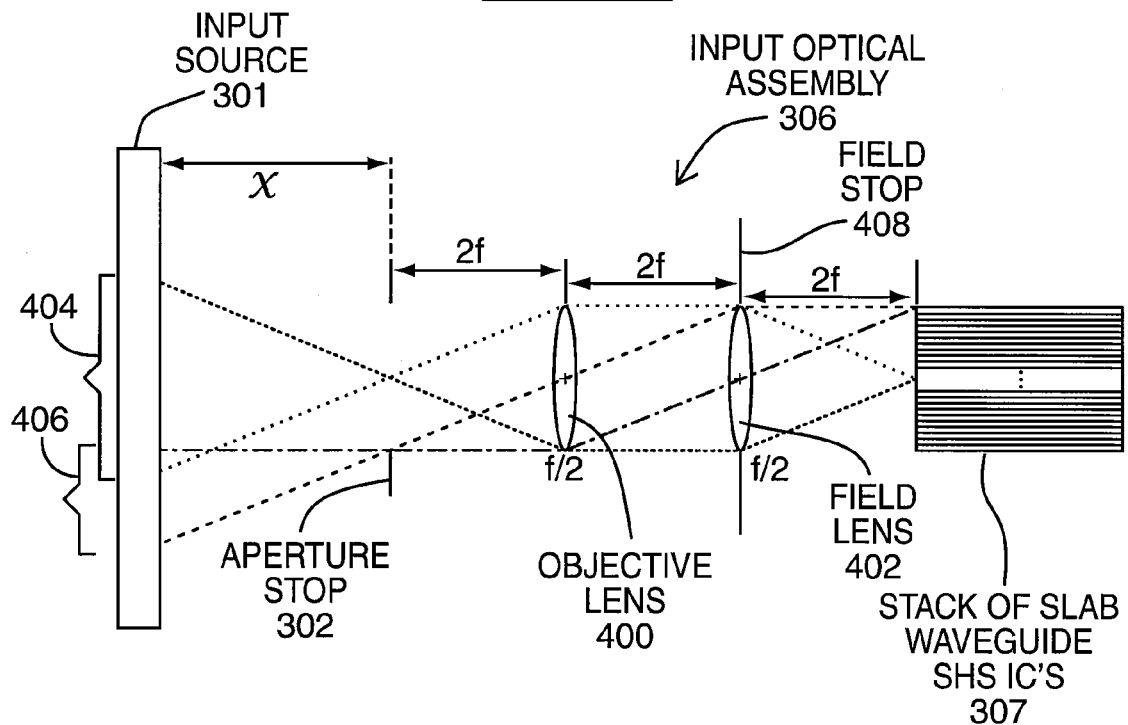
FIG. 4B is a schematic diagram illustrating a side view of an arrangement of optical elements of another exemplary embodiment of the input optical assembly of FIG. 3, adjusted for increased spatial resolution of the input signal on the apertures of the waveguides.

FIGS. 4A and 4B depict an exemplary embodiment of the input optical assembly 306 of FIG. 1. However, it should be kept in mind that there are numerous ways to apply a pupil image of a multi-lens optical module to the input aperture of the slab waveguide, and that there are numerous ways to apply the input light signal to an interferometer uniformly in brightness and spectral content, while also being adjustable to provide varying field of view and spatial resolution.

The exemplary configuration shown in FIGS. 4A and 4B allow provision for applying the input light signal to the input apertures of each of the individual slab waveguide SHS integrated circuits 308 that act as interferometers within the stack of slab waveguide SHS integrated circuits 307, uniformly in brightness and spectral content as shown. It can also be adjustable to provide varying field of view and spatial resolution, which will be explained in detail. The input optical assembly 306 consists of a pair of identical positive lenses 400 and 402, with the objective lens 400 positioned at the input aperture, and a field lens 402 positioned at the focus of the objective lens. As shown, the input facets of the stacked slab waveguide spatial heterodyne spectrometer (SHS) integrated circuits 308 are placed at the rear focus of the field lens. Also as shown, an aperture stop 302 is placed in front of the objective lens 400 at a distance equal to the focal length of the objective lens 400. Optionally, the input optical assembly may benefit from a field stop 408 placed around the field lens 402 (not shown).

Figure 5:
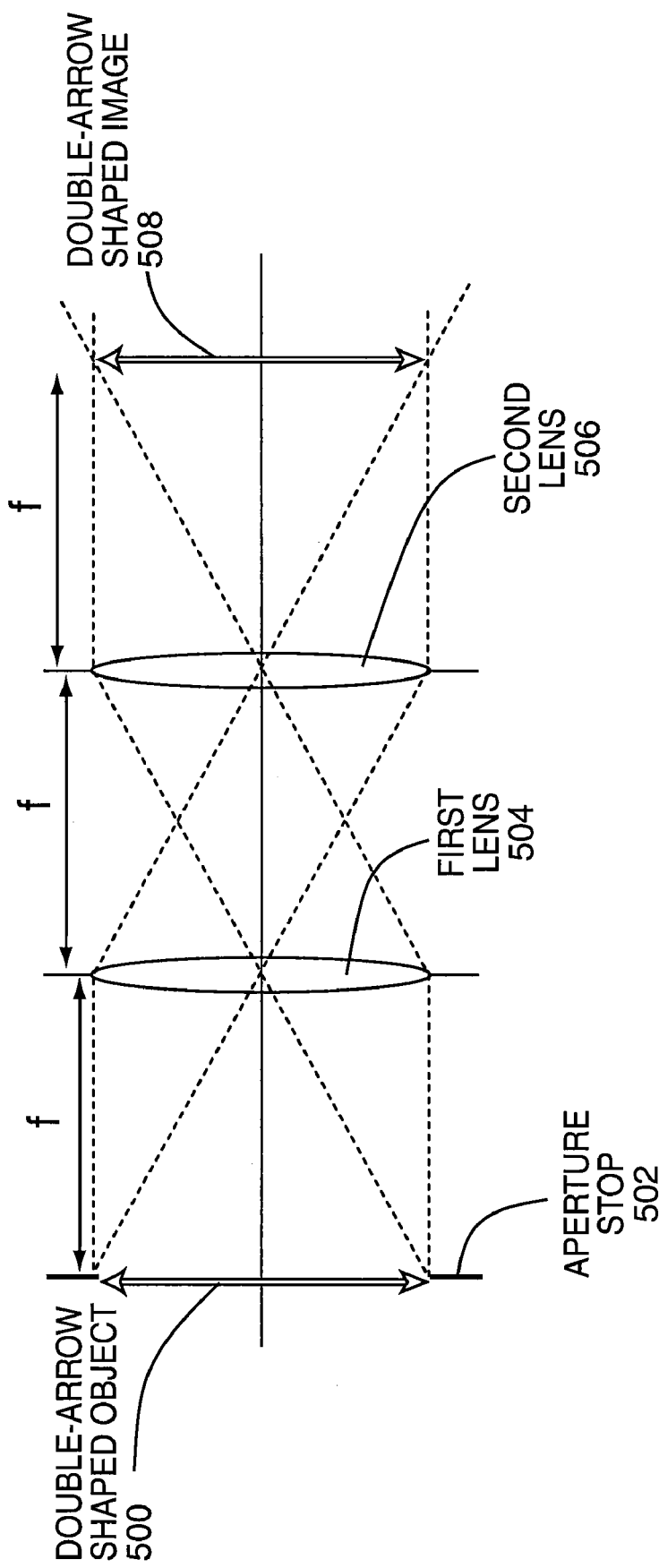
FIG. 5 is a schematic diagram illustrating a side view of the exit pupil of the input optics assemblies of FIGS. 4A and 4B.

When the objective lens 400 is placed at the focal length of the field lens 402, with the aperture stop 302 placed at the focal length of the objective lens 400, the pupil image is the same size as the aperture stop at the rear focus of the field lens 402 as shown in FIG. 5. The double-arrow shaped object 500 represents the entire space of aperture 502 and double-arrow shaped image 508 is at the rear focus of the second lens 506. The second lens 506 is positioned at the focus of the first lens 504.

It should be noted that in the exemplary embodiment of the input optical assembly 306 shown in FIGS. 4A and 4B, the input facet of the stack of slab waveguide spatial heterodyne spectrometer (SHS) integrated circuits 307 is also positioned at the rear focus of the field lens 402. FIG. 5 shows how the pupil image can be applied precisely and entirely to the input facet of the stack of slab waveguide spatial heterodyne spectrometer (SHS) integrated circuits 307 in FIGS. 4A and 4B. This configuration allows for illumination of the entire facet, which is desirable in this application. Also, the viewing angles on the variable band-pass filter can be minimized by imaging the field of view at infinite conjugate onto the intermediate field stop 408 as shown in FIGS. 4A and 4B.

Infinite conjugate can be achieved when the objective lens 400 is either used to collimate the source light rays or to focus collimated light rays from a source. In this configuration, one of the two conjugate distances can be approximately equated to infinity, where the conjugate distances are generally defined as the distance from an object to the lens (S), and the distance from the lens to the image (S'). In this case, S is the distance from the input signal source 301 to the objective lens 400, and S' is the distance from the objective lens 400 to the field stop 408.

Furthermore, it should be understood that the input optical assembly 306 shown in FIGS. 4A and 4B can be made adjustable to allow for a trade off between signal intensity and spatial resolution. To obtain higher spatial resolution, the f-number of the input optical assembly 306 can be increased through any number of methods known in the art (e.g. zoom-lens). A concomitant result of an increase in the f-number is reduced brightness, or light gathering ability (étendue) of the optics module. As shown, the lens system of FIG. 4A uses a f-number of f/1 while FIG. 4B depicts the same system using a f-number of f/2. It should be understood that these are guidelines only and can vary significantly in real applications.

The f-number expresses the diameter of the entrance pupil in terms the effective focal length of the lens. The entrance pupil is the virtual aperture that defines the area at the entrance of the lens system that can accept light. In general, this would be the aperture stop. A lens system with a low f-number will provide brighter image with a wide field of view, but as a tradeoff, it has less magnifying power and spatial resolution.

The f-number, f/#=f/D where f is the effective focal length and D is the diameter of the entrance pupil. If the aperture stop width is reduced, the f-number will increase. Etendue will decrease due to the reduced aperture size. For example, an increase from f/1 to f/2 as shown in FIGS. 4A and 4B represents a four times reduction in étendue.

Another alternative is to provide the ability to modify the effective focal length of the lens system by any number of methods known in the art such as a zoom lens or a focal reducer/increaser corrector. A simplified representation of the result of such a change is shown in FIG. 4B where the focal lengths of the identical lens 400 and 402 are doubled with their locations readjusted. Doing so will reduce the area of the scene being sampled by the spectrometer and thus increase the spatial resolution of the system at the cost of a reduction in étendue. The sampling region of the central stacked slab waveguides 404 and the sampling region of the upper stacked slab waveguides 406 are shown. As can be seen, the field of view is smaller in FIG. 4B in comparison to FIG. 4A due to an increase in the f-number.

Essentially, this exemplary lens system is adjustable in order to achieve a trade off between signal intensity and field of view/spectral resolution. The configuration of FIG. 4B provides increased spatial resolution and decreased brightness in comparison to that associated with the configuration of FIG. 4A. Additionally, when the objective lens 400 and field lens 402 are identical and separated by their focal distances, there is an additional benefit of naturally providing partial vignetting of a double-sided interferogram. Vignetting of the interferogram results in apodization of the spectrum. Since there is a finite sample in the Fourier Sum, apodization is desirable since it can smooth out the discontinuities at the starting point and ending point of the sampled records. This provides some degree of intensity profile shaping toward the edges. Furthermore, by averaging both sides of the interferogram, this configuration provides an average spectrum over the entire field of view, thus decreasing the possibility of spectral artifacts due to variations in the scene.

It is important to note that the lenses and f-numbers described in FIG. 4A and FIG. 4B are representative of a generalized lens assembly and are positioned as they would be with a "thin lens" approximation to project an image of the aperture stop onto the slab inputs. General implementations may make use of technologies such as thick lenses, cemented doublets and triplets, and the positions and parameters would vary.

The input optical assembly 306 operates as an optical projector to project a flat uniform pupil (image of the aperture stop) onto the inputs of the individual slab waveguide SHS integrated circuits 308, to allow optical magnification to minimize the angles at the filter position at the cost of a larger objective lens, to image the field of view at infinite conjugate onto an intermediate field stop, to minimize angles on the filter and to provide zooming capability to narrow the field of view at maximum brightness to focus on targets.

Besides the exemplary method of using the embodiment of the input optical assembly 306 described above, another possible use would be to directly image a target scene onto the input facet of the slab. In the case of an inhomogeneous target scene, such a method of use requires a means of scanning the scene image linearly across the input facet such that each region of the target scene is imaged onto each slab waveguide SHS integrated circuit 308 aperture in fast succession along the entire length of the facet. This can be achieved through any number of means that are known to people skilled in the art. The input optical assembly 306 may adapt to these means. These means can be the use of a scanner, such as 1) a fast scanning mirror, or 2) through fast linear motion of the detector camera relative to the scene. A sequence of frames is then stored, and a uniformly illuminated interferogram can then be established from these frames for each target region.

FIG. 6 illustrates the preferred arrangement of the stacked slab waveguide spatial heterodyne spectrometer (SHS) integrated circuits 307. As discussed, the individual slab waveguide spatial heterodyne spectrometer (SHS) integrated circuits 308 are vertically stacked within the stack. The input optical assembly 306 can be adjusted to apply the pupil image onto the entire input facet of the stacked slab waveguide spatial heterodyne spectrometer (SHS) integrated circuits 307. Each individual slab waveguide spatial heterodyne spectrometer (SHS) integrated circuit 308 can target a different region of the field of view. An increase in the number of individual slab waveguide spatial heterodyne spectrometer (SHS) integrated circuits 308 can increase spatial resolution of the resulting spectrum at no cost to étendue.

FIG. 7 is a cross-sectional view of two individual stacked slab waveguide spatial heterodyne spectrometer (SHS) integrated circuits 308 along the dashed line AA' of FIG. 6. For convenience, only the dissection of two stacked slab waveguide spatial heterodyne spectrometer (SHS) integrated circuits 308 are shown, namely slab waveguide SHS IC 1 and slab waveguide SHS IC 2.

Within the package of an individual slab waveguide spatial heterodyne spectrometer (SHS) integrated circuit 308, multiple back-thinned slab waveguides/wafers 702 are stacked vertically. Typical slab waveguides/wafers 702 are approximately 100 µm thick due to thickness of the inactive substrate 704. Guided modes 706 are confined to a narrow layer only approximately 5 µm in thickness. However, these wafers can be mechanically back-thinned to etch away the unnecessary material, resulting in a thin wafer on the order of approximately 10 µm thick, this thickness is chosen to match a small integral multiple of the detector pixel pitch to minimize cross-talk in the detector module.

Limitation to the thickness of each slab waveguide/wafer 702 will be determined by low-loss maintenance of guided-mode behaviors and minimization of noise due to cross-talk between subsequent slab waveguides/wafers 702.

As shown in FIG. 8A, each slab waveguide/wafer 702 can hold at least one slab waveguide spatial heterodyne spectrometer (SHS) 800, typically producing a linear array output at the exit facet. This will be shown clearly in the top view of a typical slab waveguide 702 depicted in FIG. 8A. By stacking multiple back-thinned slab waveguides/wafers 702 containing at least one slab waveguide spatial heterodyne spectrometer (SHS) 800, each tuned to detect a unique spectral region of interest, using appropriate adhesives with care to preventing unwanted stress and birefringence, multiple spatial heterodyned interferograms of the input signal are produced. These interferograms can be offered to a suitable detector module 310 such as a pixelated array detector. The detector module 310 will be discussed in detail.

A general-use, high resolution, and wide bandwidth device can be fabricated using a stack arrangement of slab waveguides/wafers 702, where each slab waveguide 702 contains at least one narrow-band slab waveguide spatial heterodyne spectrometer (SHS) 800 covering a specific spectral band for visualizing and measuring differences in the phase of a specific spectral band of input light signal. This configuration allows the plurality of vertically stacked slab waveguide spatial heterodyne spectrometer (SHS) integrated circuits 308 to analyze a narrow spectral region of the input light signal by visualizing and measuring differences in phase of the narrow spectral region of the input light signal and generating an interferogram. This is because each slab waveguide spatial heterodyne spectrometer (SHS) integrated circuit 308 contains at least one slab waveguide/wafer 702 and each slab waveguide/wafer 702 further contains at least one slab waveguide spatial heterodyne spectrometer (SHS) 800, which as discussed above can each cover a specific spectral band.

However, when each slab waveguide spatial heterodyne spectrometer (SHS) 800 in a slab waveguide/wafer 702 targets a separate spectral region, each slab waveguide/wafer 702 will require a separate band-pass filter deposited onto its input or output facet. In this case, the band-pass filter can be deposited as a linearly variable filter onto the input facet 304 or onto the output facet 305 of the stack, or onto a part 303 of the input optical assembly 306 such as the objective lens 400 as shown in FIGS. 3, 4A and 4B. The variable band-pass filter may only vary in the stacked direction while remaining uniform in the orthogonal direction of the stacked direction. In some cases, the band-pass filter may vary in the direction orthogonal to the stacked direction as well. The variation will be tuned to coincide with the spectrometer design band of each slab waveguide/wafer 702.

FIG. 8A is the top view of a typical slab waveguide/wafer 702 within a slab waveguide spatial heterodyne spectrometer (SHS) integrated circuit 308. In FIG. 8A, three slab waveguide spatial heterodyne spectrometers (SHS) 800 and three zero order waveguides 802 are shown. In the general case, each slab waveguide spatial heterodyne spectrometer (SHS) 800 is composed of an array of several MZIs 130 as shown in FIG. 1C. Each arm of each MZI 130 is a single waveguide joined at each end by a waveguide coupler. A zero order waveguide 802 is effectively a straight-through waveguide, interspersed with the other SHS MZIs 130, with no junctions or interferometric action. Zero order waveguides 802 are placed strategically throughout the slab waveguide/wafer 702 to help adjust and align the detector module 310. These slab waveguide spatial heterodyne spectrometers (SHS) 800 act as interferometers for visualizing and measuring differences in the phase of the input light signal.

As previously discussed, the output of the slab waveguide 702 typically consists of electromagnetic radiation emitted from a linear array of single-mode waveguides. Since this can be directed to any slab surface, coupling from a high-index waveguide to air is inefficient. Therefore it is important that the detector module 310 be bonded directly to the slab waveguides, such that the light is incident directly on the detector active material without encountering air. This packaging solution is commonly used with other slab waveguide applications. In the classical SHS applications, the output from the spectrometer needs to be imaged through air onto the detector to allow for interference to take place between the tilted wave fronts produced by the SHS. In the present application, the interference can be made to take place within each MZI 130 of the slab waveguide spatial heterodyne spectrometer (SHS) 800.

Furthermore, FIG. 8B shows another embodiment of the slab waveguide spatial heterodyne spectrometers (SHS) 800 utilizing Fabry-Perot cavities 142. An array of Fabry-Perot cavities 142 can be used to perform the same function as an array of MZIs 130. Each Fabry-Perot cavity 142 may consist of a single waveguide having predetermined length with partially reflecting end-facets. As shown in FIG. 8B, the individual Fabry-Perot cavities 142 are marked as FP1, FP2, etc. and the output ports 812 are directed perpendicularly to the input to avoid the occurrence of stray light in the spectrometer. Zero order waveguides 802 may also be placed strategically throughout the slab waveguide/wafer 702 in the Fabry-Perot embodiment as shown in FIG. 8B, in a similar manner as shown in FIG. 8A.

The Fabry-Perot design provides a more space efficient layout for longer path differences. Alternatively, hybrid approaches including both the MZI and Fabry-Perot designs/technologies may be used.

Figure 9:
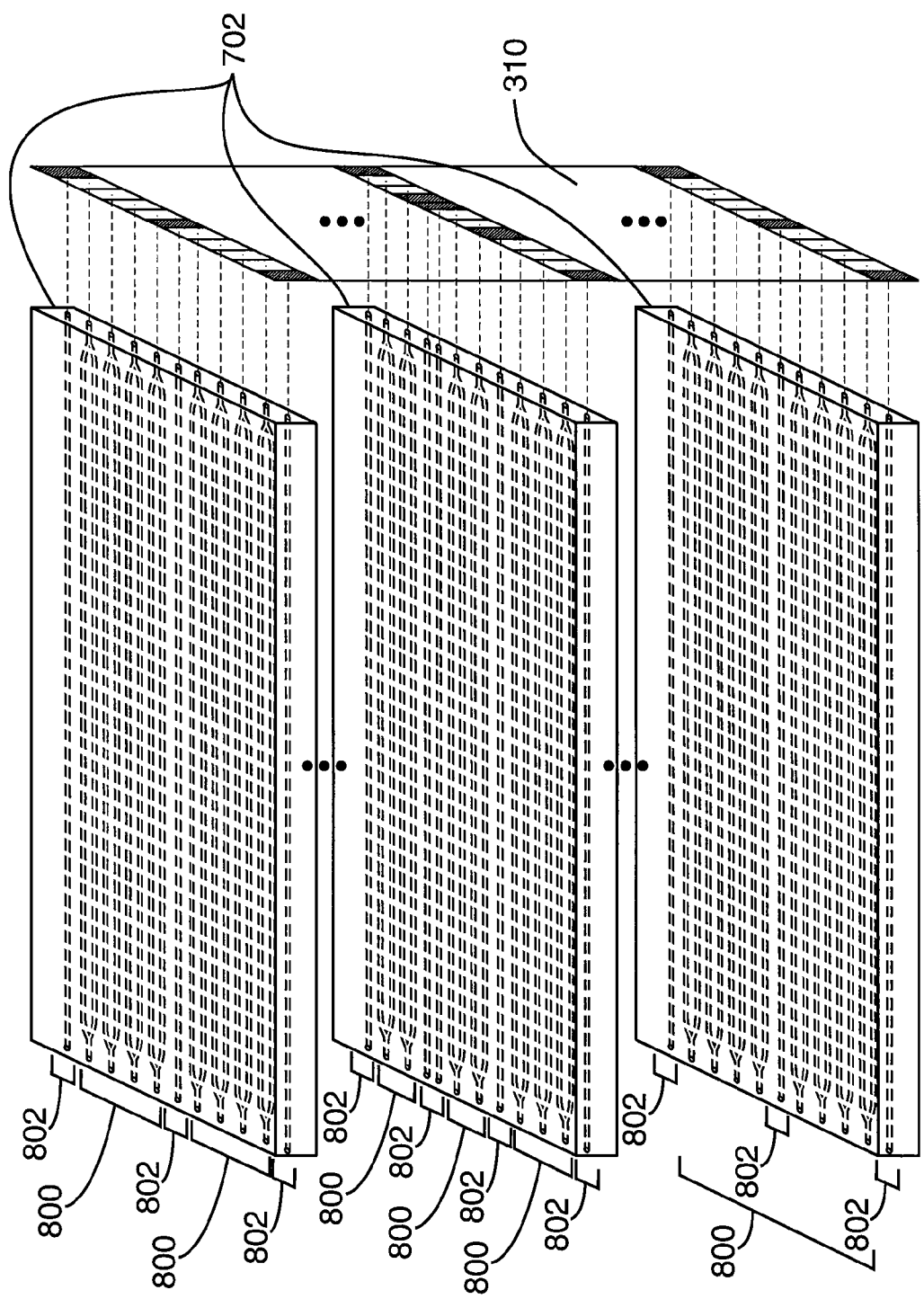
FIG. 9 is a schematic representation of a stack of slab waveguides/wafers illustrating their positioning in relation to a two dimensional array detector.

FIG. 9 shows the arrangement of a plurality of slab waveguides/wafers 702 and the corresponding relevant parts of the detector module 310. Each dashed line connects the output apertures of the MZIs 130 and zero order waveguides 802 to their corresponding detector pixel. The detector pixels can be actively aligned one-to-one to the slab waveguide output apertures that form the spatial interferogram. This can be achieved using strategically placed zero order waveguides 802 that do not incorporate any interference. Illumination of the input facet with white light will cause the zero order waveguides 802 to produce bright images on the detector, centered at each of the zero order waveguide output apertures. On the contrary, the MZI 130 output apertures will typically produce dim images on the detector due to the variable path difference incorporated in the waveguide arms of each of the MZIs.

In FIG. 9, a two dimensional array of detector elements is shown for receiving the output signals from the slab waveguide/wafer. However, an at least one dimensional array of detector elements can be used. The two dimensional array of detector elements contains rows of detector elements set next to each other as shown in FIG. 9. The number of detector elements in each row can be different and the size of each individual detector element can be different as well. The black pixels represent the bright signals outputted from the zero order waveguides. In some cases, a one dimensional array of detector can be used.

For example, in the case of having only one layer of slab waveguide/wafer 702, a one dimensional array of detector elements will suffice. The slab waveguide spatial heterodyne spectrometers 800 and zero order waveguides 802 act as interferometers and have output apertures, which form the output apertures of slab waveguide/wafer 702 and of the slab waveguide spatial heterodyne spectrometer (SHS) integrated circuits 308. Maximum alignment accuracy is achieved when these zero order waveguides 802 are placed at both ends of the horizontal waveguide array, with waveguide outputs spaced evenly along the output facet by an integer multiple of the detector pixel pitch. As is conventionally known, pitch is understood to represent the center to center distance between subsequent pixels. By actively reading out from the detector 310, while it is being positioned relative to the slab waveguides, these bright signals can each be centered on a single pixel at each end of the horizontal rows of pixels.

Zero order waveguides can be inserted between SHSs 800 to add extra spacing between the output signals of the SHSs. Additional zero order waveguides 802 can also be inserted within a SHS 800 as shown in the bottom slab waveguide 702 of FIG. 9. After the detector pixels are positioned, an adhesive layer can be compressed to prevent the spreading output beam from impinging on neighboring pixels. This can eliminate cross-talk between discrete outputs. Light from each aperture may spread to neighbouring pixels if the adhesive layer is too thick. On the contrary, if the adhesive layer is too thin, the bond may fracture when it encounters a large thermal excursion. Additionally, the pixel size should be much larger than the waveguide size for optimum cross-talk rejection. The detector can be an at least one-dimensional array of detector elements bonded directly to the output apertures of the slab waveguide spatial heterodyned spectrometers 800 and zero order waveguides 802 which act as interferometers.

When the signals are optimally aligned with the pixels it would then be possible to set the adhesive between the stacked slab waveguide SHS integrated circuits 307 and the detector 310, typically using UV or thermal-cure methods commonly known to art. The detector 310 may be a one dimensional array of detector elements or a two dimensional array of detector elements as shown in FIG. 9. Furthermore, referring back to FIG. 7, a varying taper can be incorporated at the input of the slab waveguides 702. This will balance out the expected drop in output brightness from the bright zero order channels 802 to the typically dim maximum path difference channels. It allows for a uniform integration time for all pixels without risk of saturation. Alternatively, a varying integration time can be applied to account for expected variations in output brightness across the interferogram. It is possible assuming that a randomly accessible readout mode is available for the detector 310. This allows more averaging in order to filter out background noise and boost the signal to noise ratio.

Figure 11:
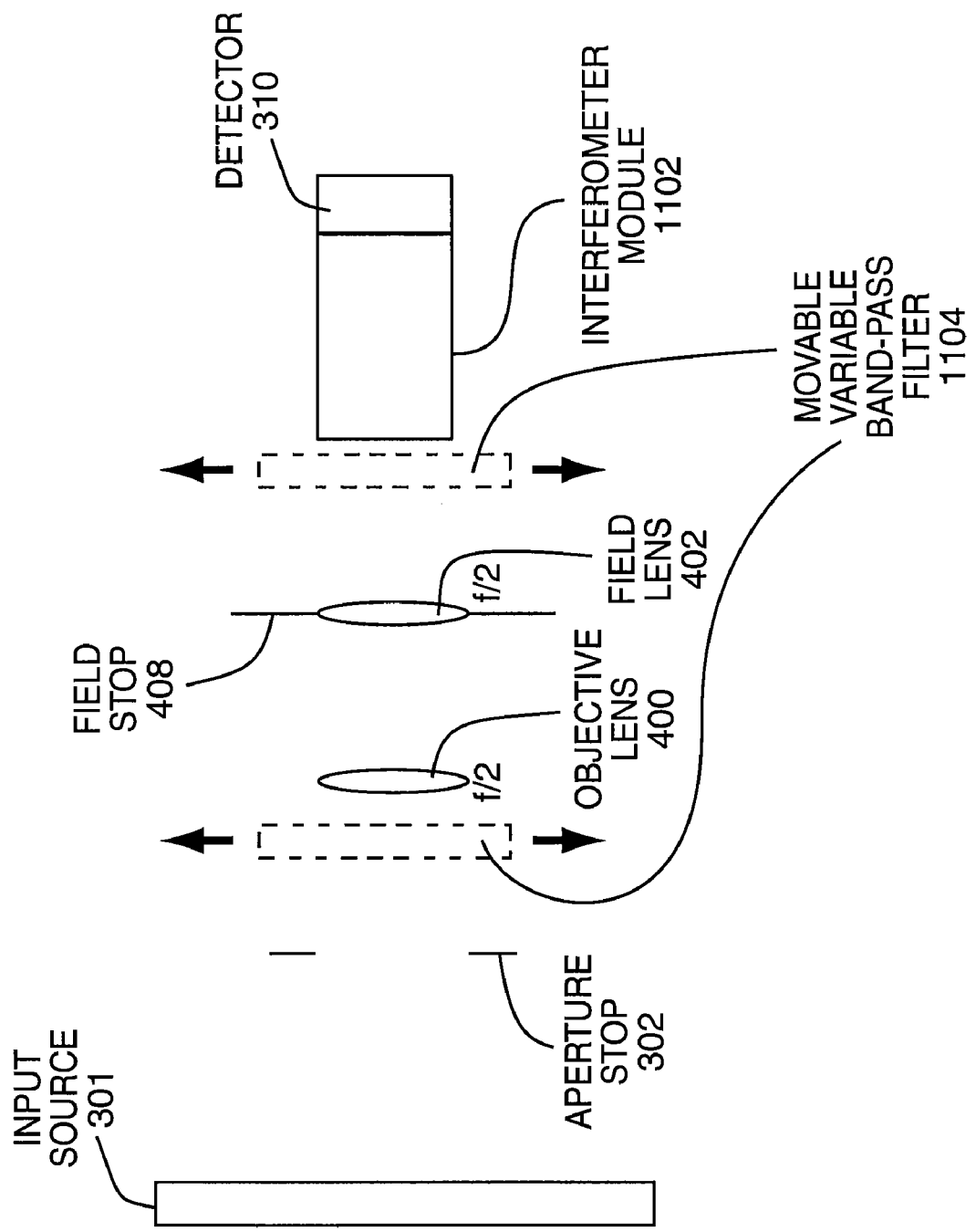
FIG. 11 is a schematic diagram illustrating a side view of an exemplary embodiment of the input optical assembly of FIG. 3, with a movable variable band-pass filter.

Referring now to FIG. 11, shown there is a configuration of a micro spectrometer with only one interferometer module 1102. The interferometer module 1102 can be comprised of one or more interferometers, or one or more slab waveguide/wafers 702 with one or more slab waveguide spatial heterodyne spectrometers (SHS) 800. Further the interferometer module 1102 may also contain one or more slab waveguide spatial heterodyne spectrometer (SHS) integrated circuits 308 with one or more slab waveguide/wafers 702.

The movable variable band-pass filter 1104 is designed to be scanned across the input aperture of the interferometer module 1102. The variable band-pass filter 1104 is needed for limiting the bandwidth to prevent spectral aliasing in each desired waveband and may be mounted to a flat glass plate. The moveable variable band-pass filter 1104 can be mechanically moved up and down in front of the interferometer module 1102 by common motor configurations (as shown by the arrows in FIG. 11).

For example a stepper motor can be used to offer repeatable positioning of the variable band-pass filter 1104 in one axis. It is possible to position the variable band-pass filter at the output aperture of the interferometer module in order for it to be scanned across the output aperture of the interferometer module 1102. The output aperture of the interferometer module, however, should be bonded directly to the detector 310, which can be an at least one-dimensional array of detector elements, to prevent an air gap between the detector 310 and the output aperture of the interferometer module 1102. Therefore it is preferred to place the variable band-pass filter 1104 either in front of the objective lens 400, or directly in front of the interferometer module 1102 for it to be scanned by the interferometer module 1102 across the input aperture. The choice of position of the variable band-pass filter 1104 should not otherwise affect performance of the system.

This configuration is particularly useful when it is desired to minimize the number of interferometers, or slab waveguide/wafer 702, or SHS ICs without compromising the range of the spectrum coverage. More specifically, in the case of a single generalized slab waveguide spatial heterodyne spectrometer (SHS) 800, designed to function at high spectral resolution in any narrow waveband across a wide spectral region, the variable band-pass filter could be scanned in a stepwise fashion across the input aperture of the single generalized slab waveguide spatial heterodyne spectrometer (SHS) 800 to build up a series of sequential narrow band spectra to cover the entire broad spectral region. Scanning the variable band-pass filter in stepwise fashion refers to scanning in steps in the direction of the linear variation of the variable bandpass filter.

There are many factors to be considered when positioning the optical filter such as particulars concerning the movable variable bandpass filter 1104 and the variable bandpass filters 303, 304, 305 within an optical chain. However, the importance of the various factors depends on the width of the bandpass. These factors are especially important when the bandpass is narrow.

The position of the filter in an optical chain is often chosen to minimize the angular spread of the rays passing through. It is well known that the filter bandpass will shift as a function of the incident ray angles, so a large distribution of ray angles will effectively broaden the bandpass and blur any sharp spectral cut-off. If the optical design includes angular magnification greater than the absolute value of 1, the sharpest spectral cut-off may be realized by positioning the filter in front of the objective lens 400 as shown in FIG. 11.

For similar reasons, if the ray cone convergence angle, defined by the "Numerical Aperture", corresponding to the f/# of the optical system is smaller than the cone angle describing the field of view, placing the filter in convergent space, or 'image' space (as opposed to collimated space) minimizes the blurring of the bandpass.

Furthermore, if the filter is placed in convergent space, and the optical design is not telecentric, meaning that the central ray of the cone converging to each field point in an image is not parallel to the optical axis, there will be a systematic bandpass shift radially outward from the central optical axis. This arrangement can cause errors in the interpretation of the interferogram. In this case, the bandpass for each path of the spatial heterodyne spectrometer (SHS) will be slightly different so that each point in the resulting interferogram will sample a different spectral interval. Therefore, a telecentric optical design is preferred for maintaining spectral uniformity across the aperture of each interferometer. For the aforementioned reasons, care should be taken to ensure that the axis of the scanning of the variable band-pass filter is perpendicular to the axis of the slab waveguide input facet(s).

Figure 12A:
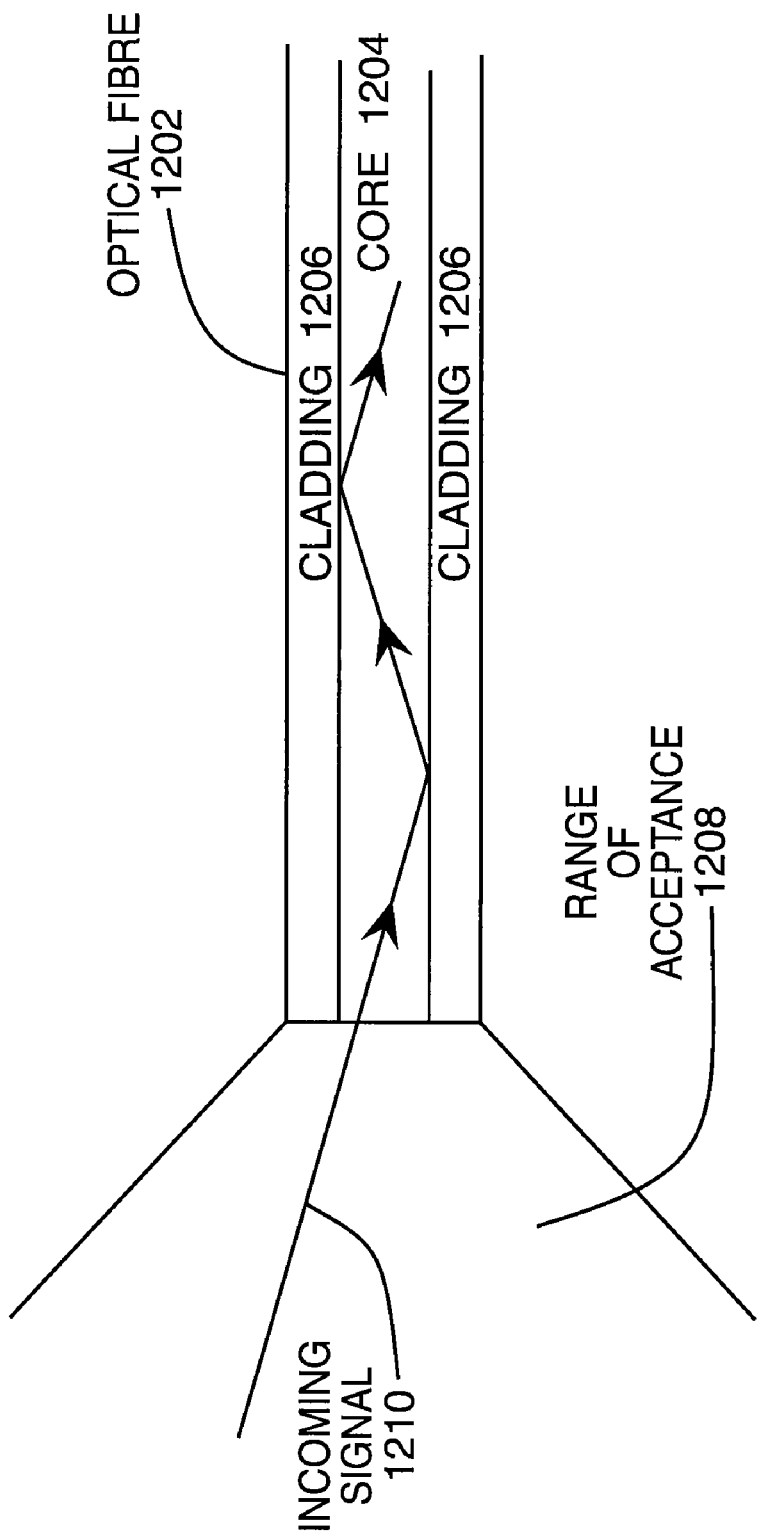
FIG. 12A is a cross-sectional view of an optical fibre that is utilized as a waveguide for guiding light along its length.

Referring now to FIG. 12A, an optical fibre 1202 can be utilized as a waveguide for guiding light along its length. Since an incoming light signal 1210 is bounded within the range of acceptance 1208, it can be confined and guided within the core 1204 due to total internal reflection. The range of acceptance 1208 can be determined from the critical angle defined by the refractive index of the core 1204 and the optional cladding 1206. An incoming light signal from within the range of acceptance 1208 will impinge the boundary of the core and the cladding at an angle greater than the critical angle of this boundary, and therefore will be totally reflected. However, an incoming light signal from outside the range of acceptance 1208 will be refracted from the core 1204 into the cladding 1206, and therefore will not be guided along the length of optical fibre 1202.

Figure 12B:
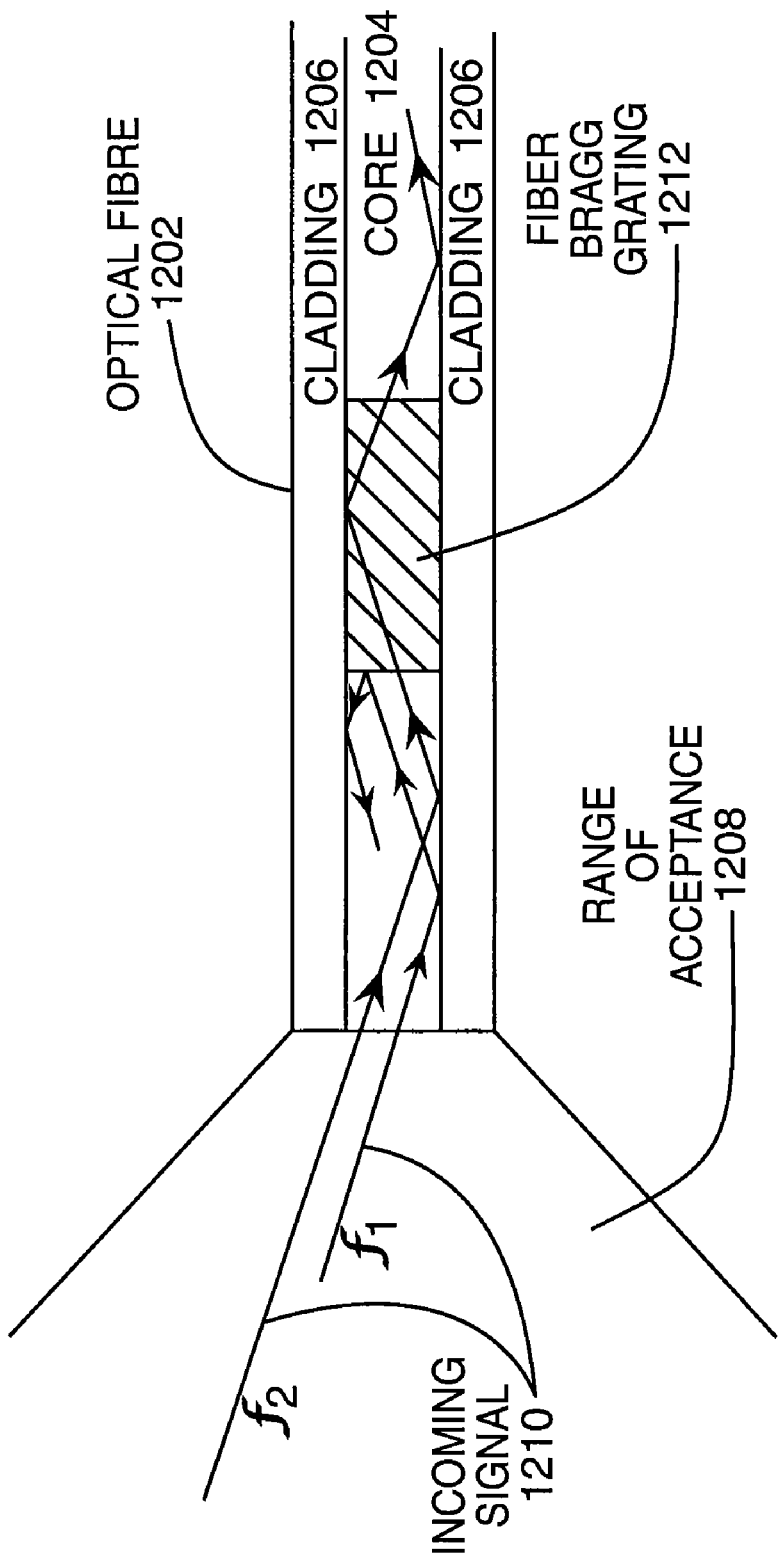
FIG. 12B. is a cross-sectional view of an optical fibre that contains a fibre Bragg grating which acts as an optical bandpass filter to block certain wavelengths of light.

Referring to FIG. 12B, the optical fibre 1202 is now shown containing a fibre Bragg grating 1212. A fibre Bragg grating is a type of reflector constructed in a segment of an optical fibre core 1204 that reflects a particular range of wavelength of light while transmitting all others. As shown in FIG. 12B, an incoming light ray of wavelength $\lambda_1$ is transmitted while another light ray of wavelength $\lambda_2$ may be reflected. As shown, the fiber Bragg grating effectively acts as an optical bandpass filter to block certain wavelengths of light.

Figure 13:
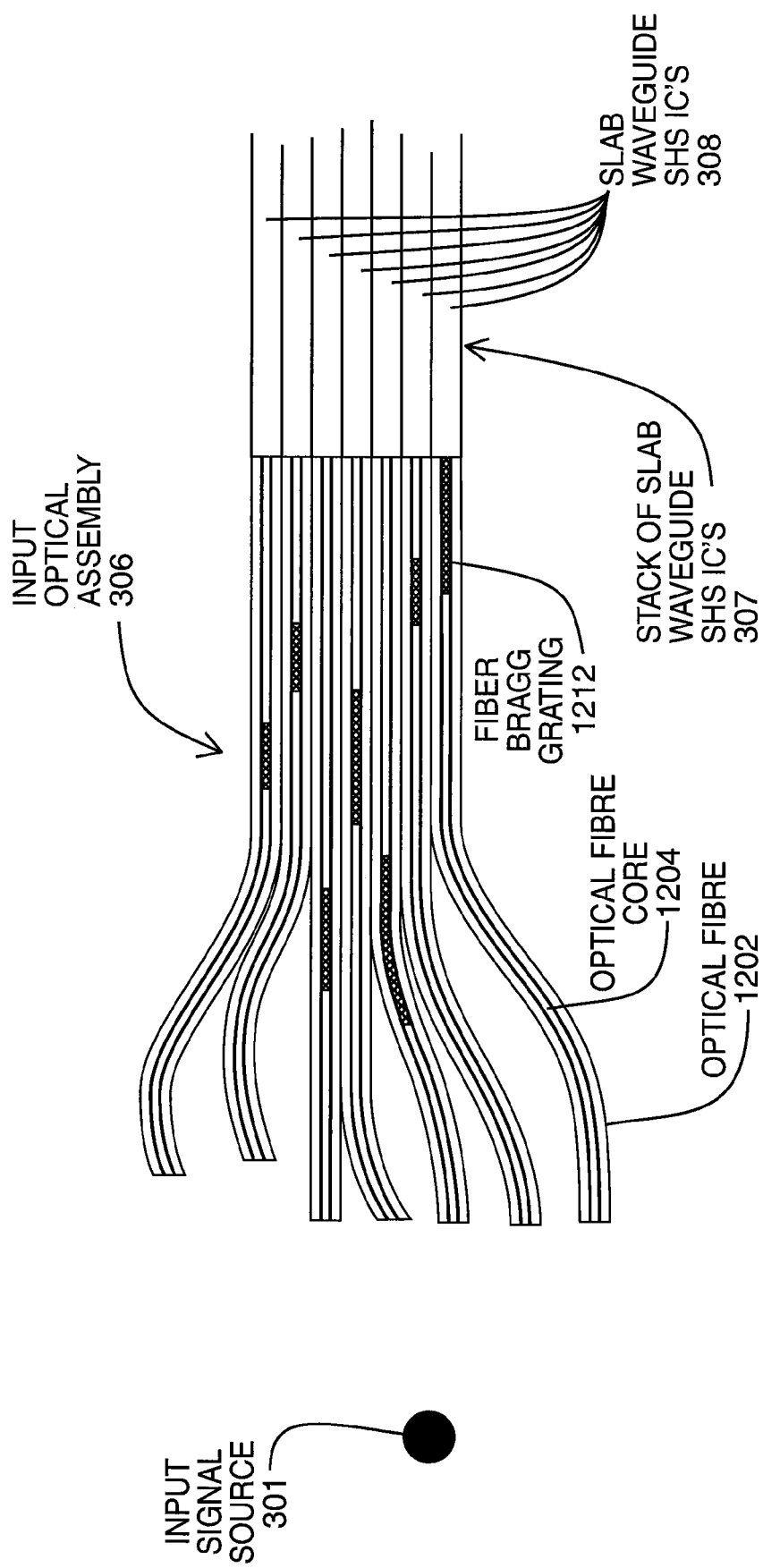
FIG. 13 is a partial cross-sectional view of a micro-spectrometer that uses an input optical fibre bundle.

In FIG. 13, a configuration of a micro-spectrometer that utilizes an input optical fibre bundle 1302 is shown. The input optical assembly 306 comprises of a bundle of optical fibres 1202 each having fibre Bragg gratings.

The optical fibres 1202 may be separated on one end and reformatted into a line of individual optical fibres 1202 on the other end for interfacing directly to the input facets of a slab waveguide spatial heterodyne spectrometer (SHS) integrated circuits 308 or with a stack of slab waveguide spatial heterodyne spectrometer (SHS) integrated circuits 307. It should be noted that this configuration of the micro-spectrometer will not contain an air interface anywhere. Accordingly, this configuration does not require any kind of classical optical lens system in order to apply an input light signal to the input facets of the slab waveguide spatial heterodyne spectrometer (SHS) integrated circuits 308 uniformly in brightness and spectral content. However, it should be understood that the usage of fibre Bragg gratings is only one of the many possible filtering implementations, and that external filters and other filtering methods known to persons skilled in the art could be applied depending on other design criteria.

Figure 10:
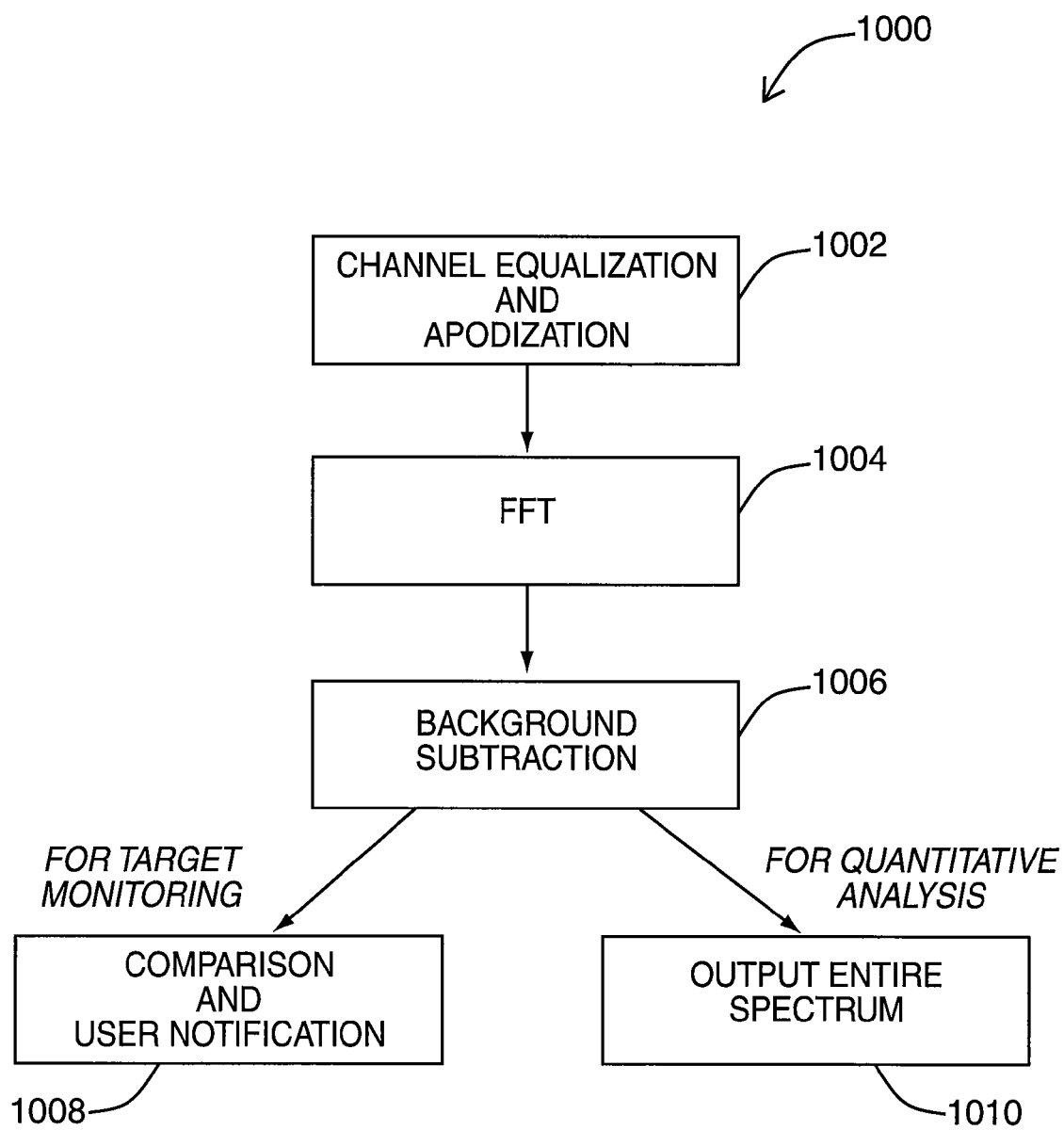
FIG. 10 is a flowchart diagram that illustrates the operation of the processor of FIG. 3.

FIG. 10 is a flowchart that illustrates the basic steps 1000 taken by the processor 312 to process the spatially distributed interferogram. It should be understood that the steps of the methods described herein may be provided as executable software instructions stored on computer-readable media.

First, at step (1002), the processor 312 performs channel equalization and if necessary, apodization. This will correct the errors in the waveguide fabrication process that result in throughput variations between individual waveguides. This is possible because these variations are fixed over the narrow waveband of each slab and can thus be calibrated out electronically prior to performing the Fast Fourier transform (FFT) at step (1004). After that, the spatial distributed interferogram from the detector 310 is processed using a FFT to create a heterodyned spectrum.

In order to remove varying background from the spectrum to detect a clear line spectrum, target spectral line, or band of clear lines, a background subtraction algorithm is followed at step (1006). Over narrow spectral regions, a straight-line fit of the lowest intensity spectral regions should suffice, but a low order polynomial could be used if necessary. Lastly, the resulting line spectrum for either absorption or emission can be compared to a programmable threshold to determine whether detection has been made at step (1008), and a notification can be provided to the user if detection has been made. For quantitative applications, the entire spectrum output can be generated as a result to the user at step (1010), whereas for targeted monitoring applications, the indication of detection and a notification provided to the user if detection has been made may be all that is necessary.

For optimum speed in the usage of a standard Radix FFT algorithm with a sequential readout detector, it would be possible to arrange the output channels of the multi-waveguide aperture device in reverse bit-order. Two numbers are bit-reversed values of each other when the binary representation of one is the mirror image of the binary representation of the other. To put a sequence in bit-reversed order, replace each element in the linearly ordered sequence with its bit-reversed counterpart.

It is advantageous to arrange the output channels of the multi-waveguide aperture device in reverse bit-order because the data ordering required by standard radix-2 FFT is in bit reversed order and it takes time to calculate these bit-reversed indices in a digital processor. If the slab waveguide is implemented in silicon-on-insulator (SOI), it would be possible to layout the processing circuitry on the same chip as the slab waveguide, wired directly to the detector outputs for optimum speed and size.

Accordingly, the micro-spectrometer 300 uses multiple Mach-Zehnder Interferometers (MZI) 130 or Fabry-Perot Interferometers or a combination of both to provide a general-purpose broadband high spectral resolution micro-spectrometer. This application provides a significant étendue advantage over the conventional approach with less manufacturing difficulties than conventional Fourier transform spectrometers (FTS).

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A micro-spectrometer for determining spectral lines of interest of an input light signal, said micro-spectrometer comprising:
   (a) a plurality of vertically stacked slab waveguide spatial heterodyne spectrometer (SHS) integrated circuits, each directed to a unique narrow spectral region of the input light signal for visualizing and measuring differences in the phase of the narrow spectral region of the input light signal and for generating an interferogram;
   (b) a detector for detecting the interferograms generated by the interferometers and transforming them to an electronic representation of the interferograms; and
   (c) a processor for processing the electronic representation of the interferograms and determining the spectral lines of interest.

2. The micro-spectrometer of claim 1, wherein the detector is an at least one dimensional array of detector elements bonded directly to the output apertures of the plurality of vertically stacked slab waveguide spatial heterodyne spectrometer (SHS) integrated circuits.

3. The micro-spectrometer of claim 1, further comprising a variable band-pass filter deposited onto the input facet of the stacked slab waveguide spatial heterodyne spectrometers (SHS) integrated circuits, said band-pass filter having pass-band characteristics that vary in the stacked direction to coincide with a spectrometer design band of each slab wavequide spatial heterodyne spectrometer (SHS) integrated circuit but which are uniform in the direction that is orthogonal to the stacked direction.

4. The micro-spectrometer of claim 1, further comprising a variable band-pass filter deposited onto the output facet of the stacked slab waveguides spatial heterodyne spectrometers (SHS) integrated circuits, said band-pass filter having pass-band characteristics that vary in the stacked direction to coincide with a spectrometer design band of each slab wavequide spatial heterodyne spectrometer (SHS) integrated circuit but which are uniform in the direction that is orthogonal to the stacked direction.

5. The micro-spectrometer of claim 1, further comprising a variable band-pass filter deposited onto the detector, said band-pass filter having pass-band characteristics that vary in the stacked direction of the stacked slab waveguides spatial heterodyne spectrometers (SHS) integrated circuits to coincide with a spectrometer design band of each slab waveguide spatial heterodyne spectrometer (SHS) integrated circuit but which are uniform in the direction that is orthogonal to the stacked direction.

6. The micro-spectrometer of claim 1, further comprising a movable variable band-pass filter, wherein the movable variable band-pass filter is scanned in a stepwise fashion across at least one of:

i) the input apertures of the plurality of vertically stacked slab waveguide spatial heterodyne spectrometer (SHS) integrated circuits, and ii) the output apertures of the plurality of vertically stacked slab waveguide spatial heterodyne spectrometer (SHS) integrated circuits.

7. The micro-spectrometer of claim 1, wherein the processor is fabricated on the same integrated circuits as the slab waveguide heterodyne spectrometers (SHS) integrated circuits.

* * * * *